United States Patent
Leinonen et al.

(10) Patent No.: US 10,078,362 B2
(45) Date of Patent: Sep. 18, 2018

(54) POWER DELIVERY INFORMATION OVER DATA INTERFACE

(71) Applicant: Nokia Technologies Oy, Espoo (FI)

(72) Inventors: Pekka Eerikki Leinonen, Turku (FI);
Pekka Heikki Talmola, Turku (FI);
Kai Allan Inha, Järvenpää (FI)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 14/907,763

(22) PCT Filed: Aug. 13, 2013

(86) PCT No.: PCT/IB2013/056618
§ 371 (c)(1),
(2) Date: Jan. 26, 2016

(87) PCT Pub. No.: WO2015/022564
PCT Pub. Date: Feb. 19, 2015

(65) Prior Publication Data
US 2016/0187963 A1    Jun. 30, 2016

(51) Int. Cl.
*G06F 1/32* (2006.01)
*H04L 12/64* (2006.01)
(Continued)

(52) U.S. Cl.
CPC .......... *G06F 1/3296* (2013.01); *G06F 13/385* (2013.01); *G06F 13/4282* (2013.01);
(Continued)

(58) Field of Classification Search
CPC .................................................... G06F 1/3296
See application file for complete search history.

(56) References Cited

U.S. PATENT DOCUMENTS

| 5,295,843 A | 3/1994 | Davis et al. |
| 5,835,791 A | 11/1998 | Goff et al. |

(Continued)

FOREIGN PATENT DOCUMENTS

| CN | 101622612 A | 1/2010 |
| CN | 102436434 A | 5/2012 |

(Continued)

OTHER PUBLICATIONS

"USB Battery Charging Specification V1.2", Compliance Plan, Revision 1.0, Oct. 12, 2011, 166 pages.

(Continued)

*Primary Examiner* — Tammara R Peyton
(74) *Attorney, Agent, or Firm* — Mintz Levin Cohn Ferris Glovsky and Popeo, P.C.

(57) ABSTRACT

It is inter alia disclosed to transmit a signal between a communication pin (112) of a first data interface (110) of the apparatus (103) and a second data interface (120) of the apparatus, wherein the signal at least provides information related to a power transmission between a power supply pin (111) of the first data interface (110) and a power supply pin (121) of the second data interface (120), wherein the first data interface (110) is configured for a connection with a first apparatus (101) and the second data interface (120) is configured for a connection with a second apparatus (102).

27 Claims, 13 Drawing Sheets

(51) Int. Cl.
*G06F 13/38* (2006.01)
*G06F 13/42* (2006.01)

(52) U.S. Cl.
CPC .......... *H04L 12/6418* (2013.01); *Y02D 10/14* (2018.01); *Y02D 10/151* (2018.01)

(56) References Cited

U.S. PATENT DOCUMENTS

| | | |
|---|---|---|
| 6,222,910 B1 | 4/2001 | Price et al. |
| 6,630,747 B1 | 10/2003 | Kamada et al. |
| 7,361,059 B2 | 4/2008 | Harkabi et al. |
| 7,387,539 B2 | 6/2008 | Trenne |
| 7,440,287 B1 | 10/2008 | Ni et al. |
| 7,493,437 B1 | 2/2009 | Jones et al. |
| 7,865,629 B1 | 1/2011 | Tantos et al. |
| 8,043,099 B1 | 10/2011 | Ni et al. |
| 8,057,106 B1 | 11/2011 | Zhovnirovsky et al. |
| 8,154,247 B2 | 4/2012 | Inha et al. |
| 8,882,524 B2 | 11/2014 | Golko et al. |
| 8,911,260 B2 | 12/2014 | Golko et al. |
| 9,131,327 B2 * | 9/2015 | Abdelsamie .......... H04W 4/001 |
| 9,651,593 B2 * | 5/2017 | Sims ...................... H02J 7/042 |
| 2002/0049887 A1 | 4/2002 | Takahashi |
| 2002/0169915 A1 | 11/2002 | Wu |
| 2003/0172318 A1 | 9/2003 | Sugita et al. |
| 2006/0024997 A1 | 2/2006 | Teicher |
| 2006/0076977 A1 | 4/2006 | Zhu |
| 2007/0241769 A1 | 10/2007 | Song et al. |
| 2007/0243769 A1 | 10/2007 | Atsmon et al. |
| 2008/0076301 A1 | 3/2008 | Liu |
| 2008/0215765 A1 | 9/2008 | Butler et al. |
| 2011/0136381 A1 | 6/2011 | Cho |
| 2012/0159008 A1 | 6/2012 | Park et al. |
| 2012/0290761 A1 | 11/2012 | Chen et al. |
| 2013/0029527 A1 | 1/2013 | Mullins |
| 2013/0080801 A1 | 3/2013 | Choi et al. |
| 2013/0108065 A1 | 5/2013 | Mullins et al. |
| 2013/0117470 A1 | 5/2013 | Terlizzi et al. |
| 2013/0305066 A1 | 11/2013 | Mullins et al. |
| 2014/0073188 A1 | 3/2014 | Fritchman et al. |
| 2014/0075069 A1 | 3/2014 | Mullins et al. |
| 2014/0129740 A1 | 5/2014 | Wang et al. |
| 2014/0206209 A1 | 7/2014 | Kamei et al. |
| 2014/0208134 A1 | 7/2014 | Waters et al. |
| 2014/0280960 A1 | 9/2014 | Paramasivam et al. |
| 2015/0255933 A1 | 9/2015 | Sung et al. |
| 2015/0356045 A1 | 12/2015 | Soffer |

FOREIGN PATENT DOCUMENTS

| | | |
|---|---|---|
| CN | 203135171 U | 8/2013 |
| EP | 1487081 | 12/2004 |
| EP | 2264611 A1 | 12/2010 |
| EP | 2381571 | 10/2011 |
| EP | 2590274 A2 | 5/2013 |
| JP | 2002-007010 A | 1/2002 |
| JP | 2002-312085 A | 10/2002 |
| JP | 2006-068396 A | 3/2006 |
| WO | 2005/124932 A2 | 12/2005 |
| WO | 2013/070753 A2 | 5/2013 |
| WO | 2014/087193 A1 | 6/2014 |

OTHER PUBLICATIONS

Saunders, "USB Newark WG", USB 3.0 Promoter Group, Aug. 29, 2013, pp. 1-6.
Saunders, "USB Newark WG", USB 3.0 Promoter Group, Aug. 8, 2013, pp. 1-12.
"Universal Serial Bus 3.0 Specification", Revision 1.0, Nov. 12, 2008, 482 pages.
"Universal Serial Bus 3.1 Specification", Revision 1.0, Jul. 26, 2013, 631 pages.
Extended European Search Report received for corresponding European Patent Application No. 14187846.2, dated Feb. 6, 2015, 6 pages.
Extended European Search Report received for corresponding European Patent Application No. 14187845.4, dated Feb. 6, 2015, 7 pages.
Extended European Search Report received for corresponding European Patent Application No. 14187844.7, dated Feb. 6, 2015, 7 pages.
Office action received for corresponding Japanese Patent Application No. 2014-206862, dated Sep. 28, 2015, 2 pages of office action and no pages of office action translation available.
Non-Final Office action received for corresponding U.S. Appl. No. 14/050961, dated Oct. 7, 2015, 15 pages.
Office action received for corresponding Japanese Patent Application No. 2014-206847, dated Nov. 4, 2015, 3 pages of office action and 3 pages of office action translation available.
"USB Power Delivery Specification Revision 1.1", Jul. 5, 2012, pp. 1-303.
Non-Final Office action received for corresponding U.S. Appl. No. 14/051,012, dated Feb. 11, 2016, 09 pages.
Final Office action received for corresponding U.S. Appl. No. 14/050,961, dated Jun. 8, 2016, 17 pages.
Non-Final Office action received for corresponding U.S. Appl. No. 14/050,927, dated Jun. 30, 2016, 10 pages.
Notice of Allowance received for corresponding Japanese Patent Application No. 2014-206862, dated Dec. 18, 2015, 3 pages of Notice of Allowance and no page of translation available.
Final Office action received for corresponding U.S. Appl. No. 14/050,927, dated Oct. 27, 2016, 12 pages.
Office action received for corresponding European Patent Application No. 14187844.7, dated Jul. 28, 2016, 6 pages.
Office action received for corresponding European Patent Application No. 14187846.2, dated Aug. 1, 2016, 6 pages.
Office action received for corresponding Chinese Patent Application No. 201410687017.9, dated Sep. 18, 2016, 10 pages of office action and no page of office action translation available.
International Search Report and Written Opinion received for corresponding Patent Cooperation Treaty Application No. PCT/IB2013/056618, dated May 15, 2014, 18 pages.

* cited by examiner

| CC1 | TX2+ | GND | TX1+ | VBUS | D+ | D- | GND | RX1- | GND | RX2- | VBUS |
|---|---|---|---|---|---|---|---|---|---|---|---|
| VBUS | RX2+ | GND | RX1+ | GND | D- | D+ | VBUS | TX1- | GND | TX2- | CC2 |

Fig.11

| CC1 | NC | GND | TX+ | VBUS | D+ | D- | GND | RX- | GND | NC | VBUS |
|---|---|---|---|---|---|---|---|---|---|---|---|
| VBUS | NC | GND | RX+ | GND | D- | D+ | VBUS | TX- | GND | NC | CC2 |

Fig.12a

| CC1 | NC | GND | NC | VBUS | D+ | D- | GND | NC | GND | NC | VBUS |
|---|---|---|---|---|---|---|---|---|---|---|---|
| | | | | | | | | | | | |

Fig.12b

POWER DELIVERY INFORMATION OVER DATA INTERFACE

RELATED APPLICATION

This application was originally filed as PCT Application No. PCT/IB2013/056618 filed Aug. 13, 2013.

FIELD OF THE INVENTION

Embodiments of this invention inter alia relate to apparatuses comprising a data interface and methods performed by apparatuses comprising a data interface.

BACKGROUND OF THE INVENTION

Serial or parallel data interfaces are known for connecting different apparatuses to each other. For instance, Universal Serial Bus (USB) interfaces are used at a plurality of apparatuses.

Such data interfaces may comprise a power supply pin, which might be used to transmit power from one apparatus to another apparatus.

With devices compatible with the USB 2.0 standard, it is possible to provide a maximum charging power of about 2.5 W to a compatible device, while the USB 3.0 standard allows a supply of up to about 4.5 W. The maximum charging power which can be provided by chargers compatible to the so called USB Battery Charging Specification V1.2 (USB BC 1.2) is about 7.5 W. However, this is still not sufficient for a lot of today's mobile devices, which often comprise high capacity battery packs.

For tackling this problem, the so called USB Power Delivery Specification V1.0 extended this range of maximum charging power and introduced the idea of multiplexing power delivery data into the power supply line and sending the power delivery data over the VBUS pin of the USB interface. Depending on the charger's capabilities there can then be provided different profiles or operating modes allowing charging powers of up to 10 W, 18 W, 36 W, 60 W or 100 W, for example. However, this solution has certain drawbacks.

In particular, the intended multiplexing of a communication signal, such as power delivery data, modulated by frequency shift keying into the VBUS line of the USB interface may be problematic. For instance, it may require low pass filtering on both the power provider side and the power consumer side of the VBUS line. The filtering may, however, add cost, complexity, size and/or resistance to the interfaces. As a result, power dissipation in the VBUS line may be increased, which may then deteriorate the charging performance from normal Dedicated Charging Port (DCP) type USB chargers, for instance. A filtering coil, for instance, may also be prone to electromagnetic interference.

SUMMARY OF SOME EMBODIMENTS OF THE INVENTION

Improving the power transmission may be desirable. It may also be desirable to improve the use of the power supply pin. It may further be desirable to reduce costs of the implementation on the power consumer side.

According to a first exemplary embodiment of a first aspect of the invention, a method performed by an apparatus is disclosed, the method comprising transmitting a signal between a communication pin of a first data interface of the apparatus and a second data interface of the apparatus, wherein the signal at least provides information related to a power transmission between a power supply pin of the first data interface and a power supply pin of the second data interface, wherein the first data interface is configured for a connection with a first apparatus and the second data interface is configured for a connection with a second apparatus.

According to a second exemplary embodiment of a first aspect of the invention, a use of an apparatus is disclosed for transmitting a signal between a communication pin of a first data interface of the apparatus and a second data interface of the apparatus, in particular a communication pin of the second data interface, the signal at least providing information related to a power transmission between a power supply pin of the first data interface and a power supply pin of the second data interface, wherein the first data interface is configured for a connection with a first apparatus and the second data interface is configured for a connection with a second apparatus.

According to a third exemplary embodiment of a first (or second) aspect of the invention a computer program is disclosed, comprising program code for performing the method according to a first (or second) aspect of the invention when said computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a fourth exemplary embodiment of a first (or second) aspect of the invention, a computer-readable medium is disclosed, having a computer program according to a first (or second) aspect of the invention stored thereon. The computer-readable medium may for instance be embodied as an electric, magnetic, electromagnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

According to a fifth exemplary embodiment of a first (or second) aspect of the invention, a computer program product is disclosed, comprising a least one computer readable non-transitory memory medium having program code stored thereon, the program code which when executed by an apparatus causes the apparatus to perform a method according a first (or second) aspect of the invention.

According to a sixth exemplary embodiment of a first (or second) aspect of the invention, a computer program product is disclosed, comprising one ore more sequences of one or more instructions which, when executed by one or more processors, cause an apparatus at least to perform a method according to a first (or second) aspect according to the invention.

According to a seventh exemplary embodiment of a first (or second) aspect of the invention, an apparatus is disclosed, comprising at least one processor and at least one memory including computer program code, said at least one memory and said computer program code configured to, with said at least one processor, cause an apparatus at least to perform a method according to a first (or second) aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

In the following, features and embodiments pertaining to all of these embodiments of the above-described aspects of the invention will be described.

An apparatus according to an aspect of the invention is inter alia understood to mean an apparatus configured for performing a method according to the respective aspect of the invention.

An apparatus according to the first and/or a second aspect of the invention may (in contrast to the first and second apparatus) be referred to as the third apparatus (connecting the first and second apparatus). The first and/or second apparatus may for instance be an apparatus according to a third aspect of the invention.

As an example, a signal transmitted between the communication pin of the first data interface and the second data interface may for instance comprise transmitting the signal from the communication pin of the first data interface to the second data interface or transmitting the signal form the second data interface to the communication pin of the first data interface. For instance, the signal may be sent from the first apparatus via the first data interface of the apparatus (being connected to a data interface of the first apparatus) and the second data interface of the apparatus (being connected to a data interface of the second apparatus) to the second apparatus. Likewise, the signal may be sent from the second apparatus via the second data interface of the apparatus (being connected to a data interface of the second apparatus) and the first data interface of the apparatus (being connected to a first data interface of the first apparatus) to the first apparatus.

As an example, the data interface (for instance the first data interface and/or the second data interface) may be a serial data interface or a parallel data interface. This may hold for all aspects of the invention.

For instance, the transmitting of the signal may comprise or represent a serial or parallel communication. The signal may be a digital or analog signal.

For instance, the transmission of the signal between the communication pin of the first data interface and the second data interface might represent a unidirectional communication for transmitting data from the first apparatus to the second apparatus or a unidirectional communication for transmitting data from the second apparatus to the first apparatus or a bidirectional communication for transmitting data to and from the first and second apparatus via the third apparatus.

It is understood that the signal may be an electrical signal, in particular comprising different voltage levels, and that the signal may also be changed during the transmission. For instance, the signal may be modulated or be changed in other ways during its transmission, as along as information is transmitted between the communication pin of the first data interface and the second data interface.

For instance, the wording pin may be understood in a way that a pin of a data interface represents any type of connector of a data interface. This may hold throughout the complete description.

The information related to a power transmission may, for instance, relate to a quality of the first and/or second apparatus regarding its power use and/or power supply characteristics. For instance, the information related to a power transmission may allow for a determination of an acceptance of one or more of certain (predefined) power transmission schemes of the first and/or second apparatus. Such a power transmission scheme may for instance allow the determination of power transmission parameters, for instance power, voltage and/or current.

The power transmission may, for instance, be subsequent to the transmission of the signal providing information related to a power transmission. The signal may thus comprise information related to a power to be transmitted. However, there may already be a (previous) power transmission before said transmitting of the signal relating to a power transmission. For instance, there may be a standard power transmission. For instance, the standard power transmission may be one of a power transmission scheme of a set of (predefined) power transmission schemes, which may be initially used. After the transmission of the signal providing information related to a power transmission of a previous power transmission may be altered. For instance, the power transmission may be adapted according to the information related to a power transmission.

According to an exemplary embodiment of the first aspect of the invention, said transmitting of a signal comprises transmitting the signal between the communication pin of the first data interface and a communication pin of the second data interface. The first data interface and the second data interface of the apparatus may in this case be designed equally. The first data interface and the second data interface may be used interchangeably, for instance. As an example, the communication pin of the first data interface and the communication pin of the second data interface might also be used for device role (host/device/dual) identification purposes. For this, a signal may be transmitted between the communication pin of the first data interface and the communication pin of the second data interface relating to a device role of the first and/or second apparatus.

According to an exemplary embodiment of the first aspect of the invention, said transmitting of the signal comprises transmitting the signal between the communication pin of the first data interface and the second power supply pin of the second data interface. For this, the signal may, for instance, be multiplexed or muxed with the power transmission, for instance with space-, time- and/or frequency-division multiplexing to name a few examples. The communication pin of the first data interface and the second power supply pin of the second data interface may be electrically connected, for example.

According to an exemplary embodiment of the first aspect of the invention, the information related to the power transmission provides information about at least one of a power, a voltage and a current supported by at least one of the first apparatus and the second apparatus. For instance, a power transmission scheme may be provided, form which voltage and/or current values may be derived, which may then be used by the first and/or second apparatus for a power transmission via the power supply pin of the first data interface and the power supply pin of the second data interface.

According to an exemplary embodiment of the first aspect of the invention, said transmitting of a signal is part of a power delivery negotiating process. The transmission of the signal may also represent a power delivery negotiation process. As an example, the first and second apparatus may for instance provide information on a supported power transmission, for instance a supported power transmission scheme. As another example, the first and second apparatus may for instance provide information on whether they supply power or receive power. For instance, the signal providing at least information related to a power transmission may be a signal compatible with or be part of the USB Power Delivery Specification.

According to an exemplary embodiment of the first aspect of the invention, the method further comprises transmitting data between a data pin of the first data interface and a data pin of the second data interface. The first and/or second data interface may also comprise at least one or more further pins which may for instance represent any other well suited pin. The data pin of the first data interface and/or second data interface might be configured to be used for a serial data communication, wherein, for instance if said data interface represents a USB interface, the data pin of the first data interface and/or second data interface may represent one of a D− data pin, a D+ data pin, TX− data pin, a TX+ data pin, a RX− data pin or a RX+ data pin. Or, as a further example, there may also be more than one data pin provided at the first and/or second data interface for a data transmission. There may also be a plurality of data pins at the first data interface and/or second data interface being configured to be used for a parallel data communication. The data transmission may for instance be simultaneous or subsequent to the transmission of the signal providing information related to a power transmission and/or to the power transmission.

As an example, the transmission of a signal between the communication pin of the first data interface and the second data interface may be performed in a way that it does not disturb a USB communication and/or another communication via the data pin.

According to an exemplary embodiment of the first aspect of the invention, at least one of the first data interface and the second data interface represents a Universal Serial Bus (USB) interface. Independently form each other, the first data interface and/or second data interface may for instance represent a USB type A, type B, Mini-A, Mini-B, Micro-A or Micro-B connector. As an example, a USB compliant serial communication may be performed via at least one data pin and, as an example, simultaneously, the signal transmission via the communication pin might be performed.

For instance, the USB compatible data interface may be compatible to the USB 2.0 and/or USB 3.0 standard. For instance, the USB compatible data interface may be compatible to the USB Battery Charging Specification and/or to the USB Power Delivery Specification.

It has to be understood, that the first and/or second data interface in general is not limited to USB data interfaces. As an example, any other well-suited data interface being configured to perform a serial or parallel data communication via a data pin may also be used.

According to an exemplary embodiment of the first aspect of the invention, the apparatus is a cable or an adapter comprising a first connector comprising the first data interface and a second connector comprising the second data interface. For instance, the first and/or second data interface may comprise a plug or a receptacle.

According to an exemplary embodiment of the first aspect of the invention, the method further comprises transmitting power between the power supply pin of the first data interface and the power supply pin of the second data interface. For instance, the power may be supplied to the first apparatus or to the second apparatus. The power transmission may be adapted according to the information related to a power transmission previously provided by the signal transmitted between the communication pin of the first data interface and the second data interface. For instance, the power, the voltage and/or the current may be adapted.

According to an exemplary embodiment of the first aspect of the invention, the method further comprises filtering power transmitted between the power supply pin of the first data interface and the power supply pin of the second data interface by a filter element placed between the power supply pin of the first data interface and the power supply pin of the second data interface. The filter element may, in particular, be placed between the power supply pin of the first or second data interface and a position of combining the signal providing information related to a power transmission with the power transmission. The filtering may allow for an at least partial suppression of an unwanted component of the power transmitted. As an example, the filtering may comprise an active or passive filtering. As another example, the filtering may be an analog or digital filtering. As a further example, the filtering may comprise electronic filtering. For instance, the filtering may remove or reduce signals, for instance the signal providing information related to a power transmission, from the power supply pin of the first and/or second data interface.

According to an exemplary embodiment of the first aspect of the invention, the filter element comprises a low pass filter, in particular a coil. The low pass filter may comprise an analog component, such as a coil. The low pass filter may additionally or alternatively comprise a digital component.

According to an exemplary embodiment of the first aspect of the invention, said transmitting of a signal between the communication pin of the first data interface and the second data interface, in particular the power supply pin of the second data interface, comprises at least one of modulating and demodulating. With respect to a modulation, a carrier frequency generator may be provided by the apparatus for providing a carrier frequency to be modulated by the modulator. The carrier frequency may be modulated by the signal to be transmitted between the communication pin of the first data interface and the second data interface. With respect to a demodulation, the signal to be transmitted between the communication pin of the first data interface and the second data interface may be extracted from a carrier frequency. For instance, the modulation and/or demodulation may be done digitally or analog.

According to an exemplary embodiment of the first aspect of the invention, the signal transmitted from the first communication pin to the second data interface, in particular the power supply pin of the second data interface, is used in a modulation process and the signal transmitted from the second data interface, in particular the power supply pin of the second data interface, to the first communication pin is used in a demodulation process. As an example, the communication pin of the first data interface may transmit a digital signal to a modulator. The modulator may modulate a carrier frequency with the digital signal and transmit the modulated signal to the second data interface. Likewise, the second data interface may transmit a modulated signal to a demodulator. The demodulator may extract a digital signal from the modulated signal and transmit the digital signal to the first data interface.

According to an exemplary embodiment of the first aspect of the invention, at least one of the modulating and demodulating comprises frequency shift keying. For instance, both the modulating and the demodulating are realized with frequency shift keying.

According to a first exemplary embodiment of a second aspect of the invention, a method performed by an apparatus is disclosed, comprising transmitting a signal between a communication pin of a first data interface of the apparatus and a power supply pin of a second data interface of the apparatus, wherein the first data interface is configured for a connection with a first apparatus and the second data interface is configured for a connection with a second apparatus.

According to a second exemplary embodiment of a second aspect of the invention an apparatus is disclosed, comprising a first data interface configured for a connection with a first apparatus, the first data interface comprising at least a power supply pin and a communication pin, and a second data interface configured for a connection with a second apparatus, the second data interface comprising at least a power supply pin, wherein the apparatus is configured for transmitting power between the power supply pin of the first data interface and the power supply pin of the second data interface and wherein the apparatus is configured for transmitting a signal between the communication pin of the first data interface and the power supply pin of the second data interface.

According to a exemplary embodiment of a second aspect of the invention an apparatus is disclosed, which is configured to perform the method according to the first aspect of the invention, or which comprises first data interface means configured for a connection with a first apparatus, the first data interface means comprising at least a first power supply pin and a first communication pin and second data interface means configured for a connection with a second apparatus, the second data interface means comprising at least a second power supply pin, wherein the apparatus is configured for transmitting power between the power supply pin of the first data interface means and the power supply pin of the second data interface means and wherein the apparatus is configured for transmitting a signal between the communication pin of the first data interface means and the power supply pin of the second data interface means.

The exemplary embodiments and features described with respect to the first aspect of the invention are also disclosed with respect to the second aspect of the invention, where applicable. Furthermore, the exemplary embodiments and features described below with respect to the second aspect of the invention are also disclosed with respect to the first aspect of the invention, where applicable.

As an example, the power supply pin of the first data interface and the power supply pin of the second data interface are electrically connected and/or the communication pin of the first data interface and the power supply pin of the second data interface are electrically connected.

Generally, an electrical connection is understood to be able to at least transmit certain electrical signals. Thus, the electrical connection may comprise further electrical components, such as resistors, inductances and/or capacitors.

According to an exemplary embodiment of the second aspect of the invention, the apparatus further comprises at least one of a modulator and a demodulator for using a modulation and demodulation, respectively, in the transmission of a signal between the communication pin of the first data interface and the power supply pin of the second data interface.

According to an exemplary embodiment of the second aspect of the invention, the modulator is configured for using the signal transmitted from the communication pin of the first data interface to the power supply pin of the second data interface in a modulation process and the demodulator is configured for using the signal transmitted from the power supply pin of the second data interface to the communication pin of the first data interface in a demodulation process.

According to an exemplary embodiment of the second aspect of the invention, at least one of the modulator and demodulator is configured for a modulation and demodulation, respectively, by frequency shift keying.

According to an exemplary embodiment of the second aspect of the invention, the apparatus further comprises a filter element placed between the power supply pin of the first data interface and the power supply pin of the second data interface for filtering a power transmitted between the power supply pin of the first data interface and the power supply pin of the second data interface.

According to an exemplary embodiment of the second aspect of the invention, the filter element comprises a low pass filter, in particular a coil.

According to an exemplary embodiment of the second aspect of the invention, the first data interface and the second data interface each further comprise at least a data pin for transmitting a data signal between the data pin of the first data interface and the data pin of the second data interface.

According to an exemplary embodiment of the second aspect of the invention, the first data interface and the second data interface each further comprise at least a ground pin.

According to an exemplary embodiment of the second aspect of the invention, at least one of the first data interface and the second data interface represents a Universal Serial Bus (USB) interface.

According to an exemplary embodiment of the second aspect of the invention, the apparatus is a cable or an adapter comprising a first connector comprising the first data interface and a second connector comprising the second data interface.

According to an exemplary embodiment of the second aspect of the invention, the second connector is equal to or different from the first connector. For instance, the first and second connector may be designed as two identical connectors. In this respect, the first connector may be connectable to a first apparatus and the second connector may be connectable to a second apparatus, but also the other way around.

According to a first exemplary embodiment of a third aspect of the invention, a method performed by an apparatus is disclosed, comprising communicating a signal over a communication pin of a data interface of the apparatus, the signal at least providing information related to a power transmission over a power supply pin of the data interface of the apparatus, wherein the data interface is configured for a connection with a second apparatus.

According to a second exemplary embodiment of a third aspect of the invention, an apparatus is disclosed, comprising a data interface configured for a connection of the apparatus with a second apparatus, the data interface comprising at least a power supply pin for transmitting power and a communication pin, and a controller configured for communicating a signal over the communication pin at least providing information related to a power transmission over the power supply pin.

According to a third exemplary embodiment of a third aspect of the invention, a computer program is disclosed, comprising program code for performing the method according the third aspect of the invention when said computer program is executed on a processor.

According to a fourth exemplary embodiment of a third aspect of the invention, a computer-readable medium is disclosed, having a computer program according to the third aspect of the invention stored thereon.

According to a fifth exemplary embodiment of a third aspect of the invention, a computer program product is disclosed, comprising a least one computer readable non-transitory memory medium having program code stored thereon, the program code which when executed by an apparatus causes the apparatus to communicate a signal over a communication pin of a data interface of the apparatus, the signal at least providing information related to a power transmission over a power supply pin of the data interface of the apparatus, wherein the data interface is configured for a connection with a second apparatus.

According to a sixth exemplary embodiment of a third aspect of the invention, a computer program product is disclosed, comprising one ore more sequences of one or more instructions which, when executed by one or more processors, cause an apparatus at least to communicate a signal over a communication pin of a data interface of the apparatus, the signal at least providing information related to a power transmission over a power supply pin of the data interface of the apparatus, wherein the data interface is configured for a connection with a second apparatus.

According to a seventh exemplary embodiment of a third aspect of the invention, an apparatus is disclosed, comprising at least one processor and at least one memory including computer program code, said at least one memory and said computer program code configured to, with said at least one processor, cause an apparatus at least to perform the methods according to the third aspect of the invention.

According to an eighth exemplary embodiment of a third aspect of the invention, an apparatus is disclosed, which is configured to perform the method according to the third aspect of the invention, or which comprises data interface means configured for the connection of the apparatus with a second apparatus, the data interface means comprising at least a power supply pin for transmitting power and a communication pin, and controller means configured for communicating a signal over the communication pin at least providing information related to a power transmission over the power supply pin.

As an example, an apparatus according to the third aspect of the invention may be a power provider and/or a power consumer. For instance, an apparatus according to the third aspect of the invention may be an electronic device that is for instance capable to provide a communication over a cellular or non-cellular wireless network. For instance, an apparatus according to the third aspect of the invention may provide phone functionalities. For instance, an apparatus according to the third aspect of the invention may be or may form a part of a terminal, wherein this terminal may represent a mobile terminal. For instance, an apparatus according to the third aspect of the invention may be or may form part of a mobile phone (e.g. a smartphone), a personal digital assistant, a portable multimedia (audio and/or video) player, and a computer (e.g. a laptop or desktop computer).

In the following, features and embodiments pertaining to all of these embodiments of the above-described aspect of the invention will be described.

The exemplary embodiments and features described with respect to the first and/or second aspect of the invention are also disclosed with respect to the third aspect of the invention, where applicable. Furthermore, the exemplary embodiments and features described below with respect to the third aspect of the invention are also disclosed with respect to the first and/or second aspect of the invention, where applicable.

As already mentioned with respect to the first aspect of the invention, the apparatus of the third aspect of the invention may be referred to as a first apparatus. As also mentioned with respect to the first aspect of the invention, the apparatus referred to as a second apparatus within the context of the first, second or third aspect of the invention may also be an apparatus of the third aspect of the invention.

As already mentioned, the data interface may be a serial data interface or a parallel data interface.

For instance, said communicating of a signal may comprise sending and/or receiving a signal over the communication pin.

For instance, the data interface of the apparatus according to the third aspect of the invention may be configured for a direct or indirect connection with a second apparatus. For instance, the data interface may be configured for a connection with another (third) apparatus, which may be an apparatus of the first or second aspect of the invention, which third apparatus may in turn be configured for a connection with the second apparatus.

For instance, the signal providing at least information related to a power transmission may be a signal compatible with or be part of the USB Power Delivery Specification.

According to an exemplary embodiment of the third aspect of the invention, the information related to the power transmission provides information about at least one of a power, a voltage and a current supported by at least one of the apparatus and the second apparatus.

According to an exemplary embodiment of the third aspect of the invention, said communicating of a signal is part of a power delivery negotiating process.

According to an exemplary embodiment of the third aspect of the invention, said communicating of a signal comprises at least one of modulating and demodulating. To this end, according to an exemplary embodiment of the third aspect of the invention, the apparatus further comprises at least one of a modulator and demodulator for using a modulation and demodulation, respectively, in the communication of the signal communicated over the communication pin.

According to an exemplary embodiment of the third aspect of the invention, said communicating of a signal comprises using a signal sent over the communication pin in a modulation process and using a signal received over the communication pin in a demodulation process. To this end, according to an exemplary embodiment of the third aspect of the invention, the modulator is configured for using the signal sent over the communication pin in a modulation process and the demodulator is configured for using the signal received over the communication pin in a demodulation process.

According to an exemplary embodiment of the third aspect of the invention, at least one of the modulating and demodulating comprises frequency shift keying. To this end, according to an exemplary embodiment of the third aspect of the invention, at least one of the modulator and demodulator is configured for modulation and demodulation, respectively, by frequency shift keying.

According to an exemplary embodiment of the third aspect of the invention, the method further comprises determining a type of a second apparatus being connected to the data interface of the apparatus based on the state of the communication pin of the data interface. To this end, according to an exemplary embodiment of the third aspect of the invention, the controller is configured for determining a type of the second apparatus being connected to the data interface of the apparatus based on the state of the communication pin of the data interface.

For instance, the second apparatus may be connected to the apparatus via another (third) apparatus. The type of the second apparatus may relate to a power transmission via a power supply pin or communication via an at least one data pin. For instance, the second apparatus may comprise a data interface which may basically correspond to the data interface of the first apparatus and which may comprise a communication pin and at least one further data pin and represent a compatible data interface with respect to the data interface of the first apparatus. Thus, the second apparatus can be connected via its data interface to the data interface of the first apparatus in order to connect the first apparatus and the second apparatus to each other via the respective data interfaces.

The state of the communication pin may represent an electrical state of an electrical quantity at the communication pin and thus, for instance, said determining a type of the second apparatus being connected to the data interface might comprise detecting the electrical quantity at the communication pin. As an example, said electrical quantity might represent an electrical current at least partially flowing through the communication pin or a voltage at the communication pin. Furthermore, said determining the type of the second apparatus may further depend on the voltage of a power supply pin of the data interface. For instance, if the data interface represents a USB compatible interface, said determining the type of the second apparatus may further depend on the VBUS of the data interface.

As an example, the type of a second apparatus might be determined based on a negotiation between the first apparatus and the second apparatus via the communication pin, or the first apparatus might receive an electrical signal from the second apparatus after the second apparatus is connected to the data interface of the first apparatus (for example via the third apparatus), wherein this electrical signal is indicative of the type of the second apparatus. For instance, said type of the second apparatus might represent a type of at least one predefined type. A type of the second apparatus may for instance indicate a device role or certain capabilities of the second apparatus relating to data transfer and/or power supply, for example.

According to an exemplary embodiment of the third aspect of the invention, the method further comprises filtering power transmitted over the power supply pin by a filter element of the apparatus. To this end, according to an exemplary embodiment of the third aspect of the invention, the apparatus further comprises a filter element for filtering power transmitted over the power supply pin.

According to an exemplary embodiment of the third aspect of the invention, the filter element comprises a low pass filter, in particular a coil.

According to an exemplary embodiment of the third aspect of the invention, said communicating of a signal over the communication pin comprises modulating a quality of a voltage pull-down element or a quality of a voltage pull-up element associated with the communication pin. To this end, according to an exemplary embodiment of the third aspect of the invention, the apparatus comprises a voltage pull-down element placed between the communication pin and a ground level or a voltage pull-up element placed between the communication pin and a predefined voltage level, in particular a voltage level of the power supply pin, and wherein the controller is configured for modulating a quality of the voltage pull-down element or the voltage pull-up element in order to communicate the signal over the communication pin.

For instance, the voltage pull-up element and/or voltage pull-down element may also be used for providing an electrical signal being indicative of the device role of the apparatus or second apparatus.

According to an exemplary embodiment of the third aspect of the invention, the method further comprises transmitting power over the power supply pin of the data interface of the apparatus.

According to an exemplary embodiment of the third aspect of the invention, said transmitting of power over the power supply pin comprises transmitting power to the apparatus. To this end, according to an exemplary embodiment of the third aspect of the invention, the apparatus is configured for a power transmission over the power supply pin to the apparatus. For instance, the (first) apparatus may have the role of a power consumer. In contrast, the second apparatus may have the role of a power provider. However, it is also possible that the first apparatus has the role of a power provider, while the second apparatus has the role of a power consumer.

According to an exemplary embodiment of the third aspect of the invention, the power transmitted to the apparatus over the power supply pin is at least in part received by an energy storage element of the apparatus. To this end, according to an exemplary embodiment of the third aspect of the invention, the apparatus further comprises an energy storage element configured to receive power over the power supply pin. For instance, an energy storage element may be, form part of or comprise an electrochemical cell. The energy storage element may for instance be a battery, in particular a secondary battery.

According to an exemplary embodiment of the third aspect of the invention, the method further comprises transmitting data over at least one data pin of the data interface. To this end, according to an exemplary embodiment of the third aspect of the invention, the data interface further comprises at least one of a data pin and ground pin.

According to an exemplary embodiment of the third aspect of the invention, the data interface represents a Universal Serial Bus (USB) interface.

According to an exemplary embodiment of a fourth aspect of the invention, a system is disclosed, comprising a first apparatus according to the third aspect of the invention, a second apparatus comprising a data interface comprising a power supply pin and a third apparatus according to the second aspect of the invention, wherein the data interface of the first apparatus is connected or connectable to the data interface of the second apparatus via the first data interface and second data interface of the third apparatus.

According to an exemplary embodiment of a fifth aspect of the invention, a system is disclosed, comprising a first apparatus according to the third aspect of the invention, a second apparatus according to the third aspect of the invention, wherein the data interface of the first apparatus is connected or connectable to the data interface of the second apparatus via a cable.

As an example, the cable may comprise a first data interface comprising a power supply pin and a communication pin and a second data interface comprising a power supply pin and a communication pin, wherein the power supply pins may be interconnected with each other and the communication pins may be interconnected with each other.

For instance, the cable may be an apparatus according to the first and/or second aspect of the invention.

Other features of all aspects of the invention will be apparent from and elucidated with reference to the detailed description of embodiments of the invention presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

BRIEF DESCRIPTION OF THE FIGURES

In the figures show:

FIGS. 11-14 exemplary pinning concepts of data interfaces;

DETAILED DESCRIPTION OF EMBODIMENTS OF THE INVENTION

Figure 1A:
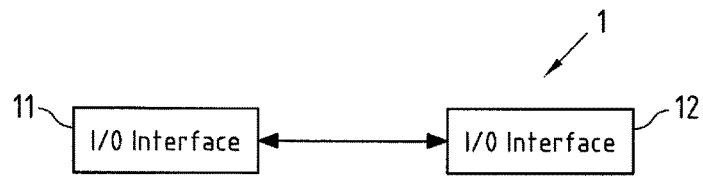
FIG. 1a: an example embodiment of an apparatus according to a first and/or second aspect of the invention.
Figure 1B:
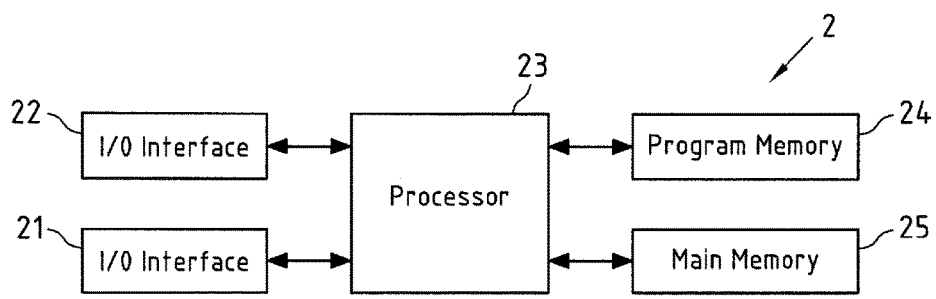
FIG. 1b: another example embodiment of an apparatus according to a first and/or second aspect of the invention.
Figure 1C:
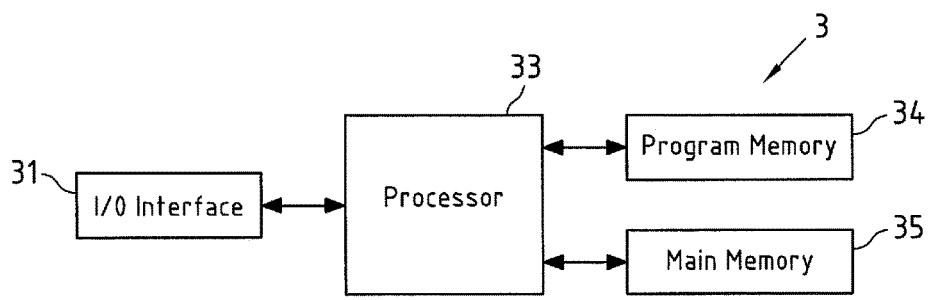
FIG. 1c: another example embodiment of an apparatus according to a third aspect of the invention.

FIGS. 1a, 1b and 1c schematically illustrate components of apparatuses 1, 2 and 3 according to embodiments of the invention. For instance, apparatuses 1 or 2 may be or form part of a cable or adapter. Apparatus 3 may for instance be an electronic device that is for instance capable to provide phone functionalities. For instance, apparatus 3 may be or may form a part of a terminal, wherein this terminal may represent a mobile terminal.

According to a first aspect of the invention apparatus 1 may for instance be configured for transmitting a signal between a communication pin of a first data interface 11 of the apparatus 1 and a second data interface 12 of the apparatus 1, wherein the signal at least provides information related to a power transmission between a power supply pin of the first data interface 11 and a power supply pin of the second data interface 12, wherein the first data interface 11 is configured for a connection with a first apparatus (not depicted in FIG. 1a; for instance apparatus 3) and the second data interface 12 is configured for a connection with a second apparatus (not depicted in FIG. 1a; for instance apparatus 3).

According to a second aspect of the invention apparatus 2 may for instance be an apparatus comprising a first data interface 21 configured for a connection with a first apparatus (not depicted in FIG. 1b; for instance apparatus 3), the first data interface 21 comprising at least a power supply pin and a communication pin, and a second data interface 22 configured for a connection with a second apparatus (not depicted in FIG. 1b; for instance apparatus 3), the second data interface 22 comprising at least a power supply pin, wherein the apparatus 2 is configured for transmitting power between the power supply pin of the first data interface 21 and the power supply pin of the second data interface 22 and wherein the apparatus 2 is configured for transmitting a signal between the communication pin of the first data 21 interface and the power supply pin of the second data interface 22.

According to a third aspect of the invention apparatus 3 may for instance be an apparatus comprising a data interface 31 configured for a connection of the apparatus with a second apparatus (not depicted in FIG. 1c, for instance via an apparatus like apparatus 1 or 2), the data interface 31 comprising at least a power supply pin for transmitting power and a communication pin, being configured for communicating a signal over the communication pin at least providing information related to a power transmission over the power supply pin.

For instance, the wording pin may be understood in a way that a pin of the data interface represents any type of connector of a data interface. This may hold throughout the complete description.

Apparatus 1, 2 or 3 may for instance be embodied as a module. Non-limiting examples of apparatus 3 are a mobile phone (e.g. a smartphone), a personal digital assistant, a portable multimedia (audio and/or video) player, and a computer (e.g. a laptop or desktop computer).

Apparatuses 2 and 3 comprise furthermore at least one processor 22, 23 (only one processor is depicted in FIGS. 1b and 1c), which may for instance be embodied as at least one microprocessor, at least one Digital Signal Processor (DSP) or at least one Application Specific Integrated Circuit (ASIC), to name but a few non-limiting examples. The at least one processor 23, 33 executes program code stored in program memory 24, 34, and uses main memory 25, 35 as a working memory, for instance to at least temporarily store intermediate results, but also to store for instance predefined and/or pre-computed databases. Some or all of memories 24, 34 and 25, 35 may also be included into the at least one processor 23, 33. Memories, 4, 34 and/or 25, 35 may for instance be embodied as Read-Only Memory (ROM), Random Access Memory (RAM), to name but a few non-limiting examples. One of or both of memories 4, 34 and 25, 35 may be fixedly connected to the at least one processor 23, 33 or removable from the at least one processor 23, 33 for instance in the form of a memory card or stick.

In case of apparatuses 2 and 3, the at least one processor 23, 33 further controls the input/output (I/O) interface 21, 22 and 31, respectively, via which the at least one processor receives or provides information to other functional units.

For instance, the data interfaces 11, 21, 22, 31 might represent a parallel or serial interface comprising a power supply pin and optionally a communication pin. At least one data pin may also be provided. As an example, the communication pin might be used for device role (host/device/dual) identification purposed. It has to be understood that the data interfaces 11, 21, 22, 31 might for instance comprise further pins, e.g. one or more ground pins, further data pins, further communication pins and/or further power supply pins. As an example, the data interfaces 11, 21, 22, 31 might represent an interface being compatible with the Universal Serial Bus (USB), wherein, as a further example, the data interface 13, 23 might be compatible with the USB 2.0 and/or 3.0 standard.

As an example, the data interfaces 11, 21, 22, 31 might represent or comprise a connector (e.g. a receptacle or a plug) which is configured to be connected to a respective connector in order to connect the apparatus 1, 2, 3 to one or more further apparatuses.

As will be described below, the at least one processor 23, 33 is at least capable to execute program code for providing any aspect of the invention. However, the at least one processor 23, 33 may of course possess further capabilities. Processor 22, 33 may additionally or alternatively be capable of controlling operation of a portable communication and/or multimedia device.

Apparatus 3 of FIG. 1*c* may further comprise components such as a user interface, for instance to allow a user of apparatus 3 to interact with the at least one processor 33, or an antenna with associated radio frequency (RF) circuitry to enable apparatus 3 to perform wireless communication. As an example, apparatus 3 may comprise one or more RF circuitry configured to perform cellular wireless communication and/or WIFI wireless communication (e.g., WLAN) and/or short range wireless communication (e.g., Bluetooth) and/or near field wireless communication (e.g., based on RFID), wherein the one or more RF circuitry may be connected to at least one antenna.

The circuitry formed by the components of apparatus 3 may be implemented in hardware alone, partially in hardware and in software, or in software only, as further described at the end of this specification.

Figure 1D:
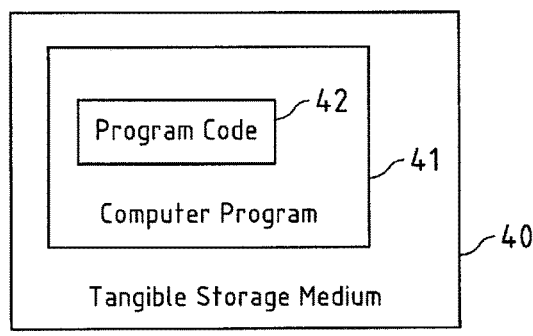
FIG. 1d: a schematic illustration of an embodiment of a tangible storage medium according to the invention.
Figure 9:
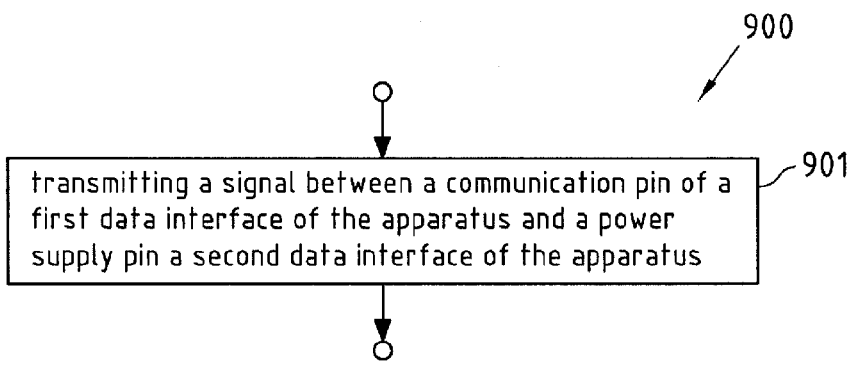
FIG. 9 an example embodiment of a method according to a second aspect of the invention.
Figure 10:
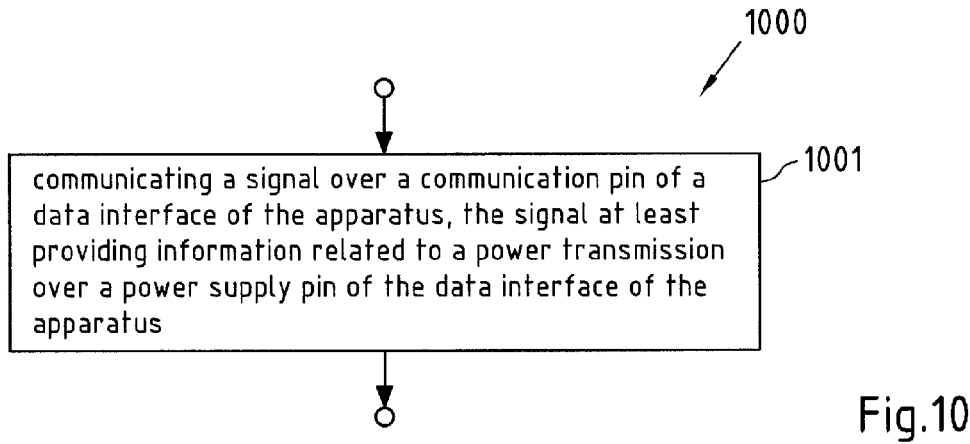
FIG. 10 an example embodiment of a method according to a third aspect of the invention.

FIG. 1*d* is a schematic illustration of an embodiment of a tangible storage medium 40 according to the invention. This tangible storage medium 40, which may in particular be a non-transitory storage medium, comprises a program 41, which in turn comprises program code 42 (for instance a set of instructions). Realizations of tangible storage medium 40 may for instance be program memory 42 of FIG. 1*b* or 1*c*. Consequently, program code 42 may for instance implement the flowcharts of FIGS. 8, 9, 10 associated with an aspect of the invention discussed below.

Figure 2:
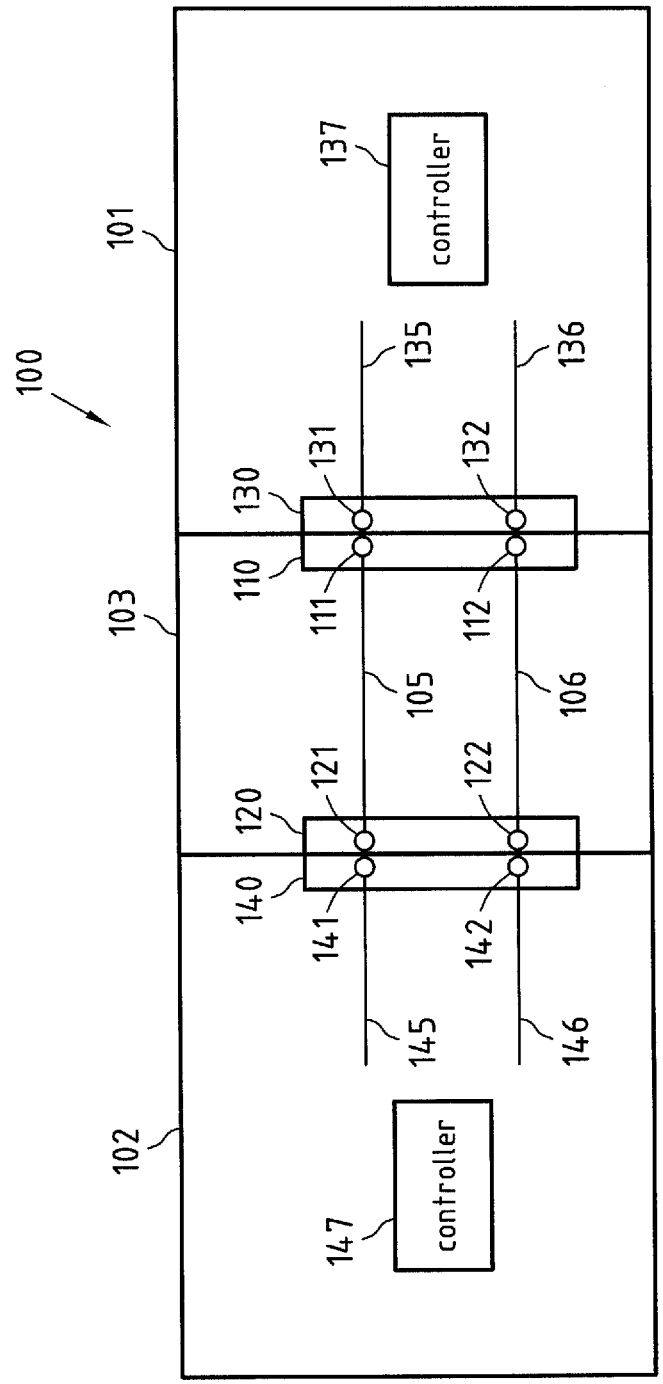
FIG. 2: an example embodiment of a system according to a fifth aspect of the invention, comprising another example embodiment of an apparatus according to a first aspect of the invention and further example embodiments of apparatuses according to a third aspect of the invention.

FIG. 2 shows an example embodiment of a system 100 according to a fifth aspect of the invention, comprising another example embodiment of an apparatus 103 according to a first aspect of the invention and further example embodiments 101, 102 according to a third aspect of the invention. Apparatus 101 is connected to apparatus 102 via apparatus 103.

Apparatus 103 (also referred to as the third apparatus) comprises a first data interface 110 configured for a connection with a first apparatus 101, the first data interface 110 comprising at least a power supply 111 pin and a communication pin 112, and a second data interface 120 configured for a connection with a second apparatus 102, the second data interface 120 comprising at least a power supply pin 121. In this embodiment, the second data interface 120 further comprises a communication pin 122. The data interfaces 110, 120 may correspond to the data interfaces 11, 12 or 21, 22 depicted in FIGS. 1*a*, 1*b*, for instance. The apparatus 103 is configured for transmitting power between the power supply pin 111 of the first data interface 110 and the power supply pin 121 of the second data interface 120. The apparatus is further configured for transmitting a signal between the communication pin 112 of the first data interface 110 and the communication pin 122 of the second data interface 420. Apparatus 103 may, for instance, represent a cable or an adapter, connecting apparatus 101 with apparatus 102. The power supply pin 111 of the first data interface 110 is electrically connected to power supply pin 121 of data interface 120 via a power supply line 105. Likewise, the communication pin 112 of the first data interface 110 is electrically connected to communication pin 122 of data interface 120 via a communication line 106.

The first apparatus 101 is an embodiment according to a third aspect of the invention. The apparatus 101 comprises a data interface 130 (which may correspond to the data interface 31 depicted in FIG. 1*c*, for example) configured for a connection of the apparatus 101 with a second apparatus. Here, data interface 130 is configured for a connection with apparatus 102 via apparatus 103. The data interface further 130 comprises at least a power supply pin 131 for transmitting power and a communication pin 132. The first apparatus 101 further comprises a controller 137 configured for communicating a signal over the communication pin 132 at least providing information related to a power transmission over the power supply pin 131. The power supply pin 131 is electrically connected to a power supply line 135, which may represent the VBUS, in case of an USB compatible data interface 130. The communication pin 132 is electrically connected to a communication line 136, which may be an RX and/or TX line, for example.

The second apparatus 102 is in this case also an embodiment according to a third aspect of the invention. The apparatus 102 comprises a data interface 140 (which may correspond to the data interface 31 depicted in FIG. 1*c*, for example) configured for a connection of the apparatus 102 with a second apparatus. Here, data interface 140 is configured for a connection with apparatus 101 via apparatus 103. The data interface 140 further comprises at least a power supply pin 141 for transmitting power and a communication pin 142. The second apparatus 102 further comprises a controller 147 configured for communicating a signal over the communication pin 142 at least providing information related to a power transmission over the power supply pin 141. The power supply pin 141 is electrically connected to a power supply line 145, which may represent the VBUS, in case of an USB compatible data interface 140. The communication pin 142 is electrically connected to a communication line 146, which may be an RX and/or TX line, for example.

For instance, the first apparatus 101 may be a power consumer comprising a power sink and the second apparatus 102 may be a power provider comprising a power source, wherein, for instance, power may be transmitted from the second apparatus 102 to the first apparatus 101 via the third apparatus 103.

The apparatus 103 may be configured for performing embodiments of a method according to a first aspect of the invention. For instance, apparatus 103 may be configured for performing an exemplary embodiment of a method according to a first aspect of the invention, as illustrated by the flowchart 800 in FIG. 8.

According to step 801 of method 800, a signal is transmitted between a communication pin 112 of a first data interface 110 of the apparatus 103 and a second data interface 120 of the apparatus. In particular, the signal is in this case transmitted between a communication pin 112 of a first data interface 110 of the apparatus 103 and a communication pin 122 of the second data interface 120 of the apparatus. The signal at least provides information related to a power transmission between a power supply pin 111 of the first data interface 110 and a power supply pin 121 of the second data interface 120.

The apparatus 101 may be configured for performing embodiments of a method according to a third aspect of the invention. For instance, apparatus 101 may be configured for performing an exemplary embodiment of a method according to a third aspect of the invention, as illustrated by the flowchart 1000 in FIG. 10.

According to step 1001 of method 1000, a signal is communicated over a communication pin 132 of a data interface 130 of the apparatus 101, wherein the signal at least provides information related to a power transmission over a power supply pin 131 of the data interface 130 of the apparatus 101 and wherein the data interface 130 is configured for a connection with a second apparatus 102.

For instance, the signal at least providing information related to a power transmission may provide information about a power, voltage and/or current supported by the first apparatus 101 and/or second apparatus 102. For this, there may be a power delivery negotiation process between the first apparatus 101 and the second apparatus 102. For instance, the first apparatus 101 acting as a power consumer only supports a power transmission up to a certain power limit, for instance up to about 60 W, to an example. Then, the power delivery negotiation would result in a power transmission of 60 W to the first apparatus 101, providing that the second apparatus 102 acts as a power provider and also supports at least said power limit. The apparatus 101 and 102 may thus negotiate a suitable power transmission for the respective situation.

For instance, the power transmission may start after said transmitting or communicating of the signal providing information related to a power transmission. However, there may also be a standard power transmission between apparatus 101 and 102 before said transmitting or communicating of the signal providing information related to a power transmission or in case no transmitting or communicating of the signal providing information related to a power transmission is possible. For instance, there may initially be a power transmission according to a standard predefined power transmission scheme.

For instance, a suitable power transmission between apparatus 101 and 102 may for instance be negotiated by apparatus 101 and 102 after a connection is established. For instance, a suitable power transmission may also be negotiated repeatedly, if necessary.

The data interface 130 of the first apparatus 101, the data interface 140 of the second apparatus 102 and the first data interface 110 and the second data interface 120 of the third apparatus 103 may also comprise additional pins. For instance, there may be provided one or more data pins, one or more ground pins, a further or more communication pins and/or a further or more power supply pins.

The communication pin 132 and/or 142 of the apparatus 101, 102 may also be used for a determination of a type of the respective other connected apparatus, for instance based on the state of the communication pin 132 and/or 142 of the data interface. For instance, the communication pin 132 and/or 142 may be used for a device role (host/device/dual) identification purpose. For instance, based on an electrical quality of the communication pin, it may be identified, that the apparatus 101 may act as a power consuming device, while the apparatus 102 may act as a power providing host.

Independently from the transmission of a signal over communication line 106, for instance simultaneously or subsequently, a power transmission over the power supply line 145, 105, 135 may be performed, for instance from the second apparatus 102 to the first apparatus 101 via the third apparatus 103. The absence of further elements between power supply line 145 and 135 may increase the efficiency of the power transmission.

The signal transmitted between the first apparatus 101 and the second apparatus 102 via communication line 106 may in particular be an unmodulated signal.

Communication line 106 may also be used for transmitting a signal other than signals providing information related to a power transmission.

System 100 may avoid the need of (de)modulating signals by using the communication pins 112, 122, 132, 142 and the communication lines 106, 136, 146. System 100 may also provide reduced resistance or energy dissipation in the power supply lines 105, 135, 145 by reducing the electrical components in the power supply line.

Figure 3:
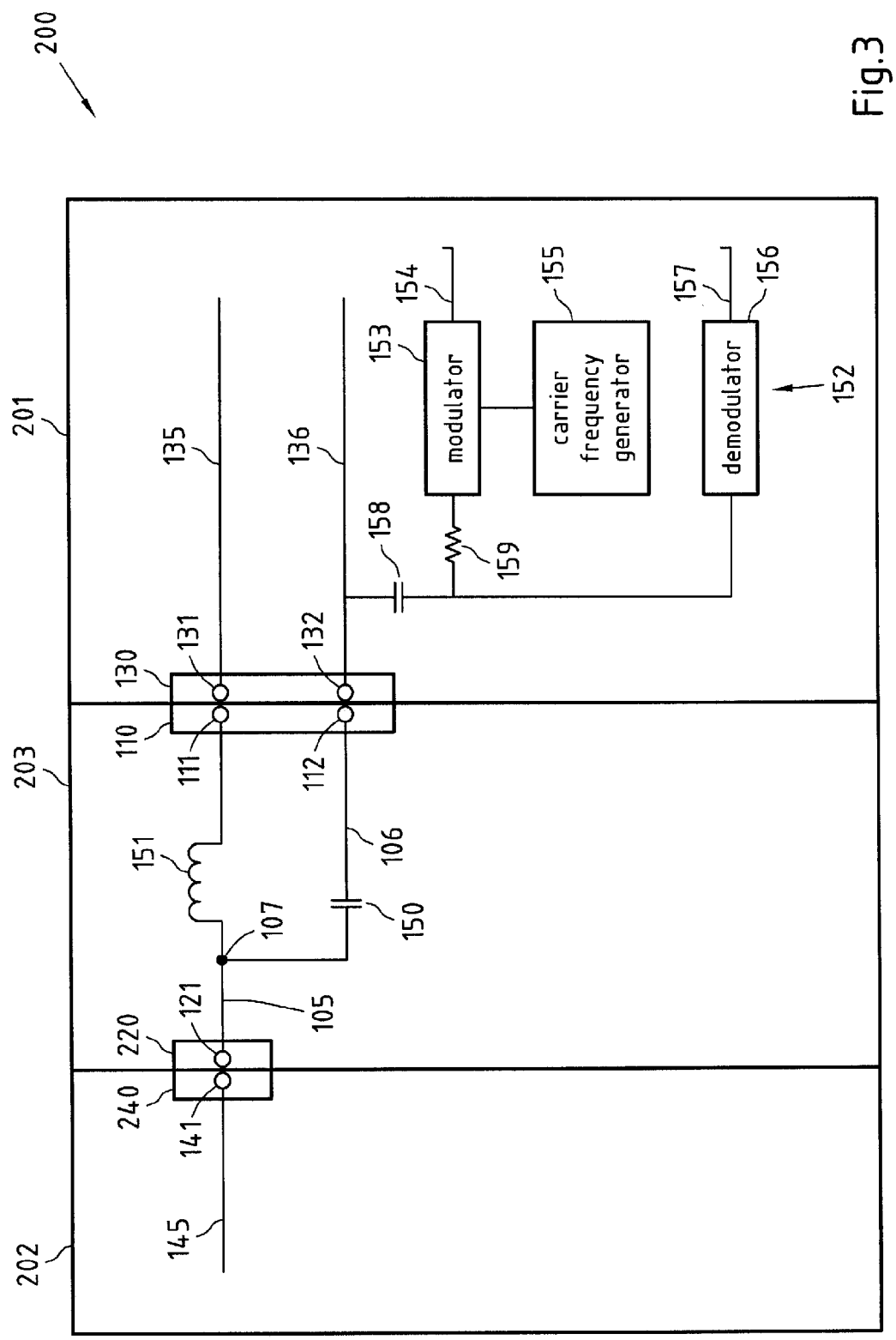
FIG. 3: an example embodiment of a system according to a fourth aspect of the invention, comprising another example embodiment of an apparatus according to a first and/or second aspect of the invention and another example embodiment of an apparatus according to a third aspect of the invention.

FIG. 3 shows another example embodiment of a system 200 according to a fourth aspect of the invention, comprising another example embodiment of an apparatus 203 according to a first and/or second aspect of the invention and another example embodiment of an apparatus 201 according to a third aspect of the invention. Apparatus 201 is connected to apparatus 202 via apparatus 203.

Similar to the second apparatus 102, the second apparatus 202 comprises a first data interface 240 comprising a power supply pin 141 connected to a power supply line 145. In contrast to the second apparatus 102 depicted in FIG. 2, the data interface 240 of second apparatus 202 may not comprise a communication pin 142 or may comprise an unconnected communication pin. For instance, the data interface 240 may represent a standard USB 2.0/3.0 Type A or Type B connector. The apparatus 202 may be configured for transmitting, for instance sending and/or receiving, a signal over the power supply pin 141, in particular a signal at least providing information related to a power transmission over the power supply pin 141.

In contrast to the third apparatus 103 described with respect to FIG. 2, the third apparatus 203 comprises a second data interface 220 adapted to data interface 240 of the second apparatus 202. Thus, the data interface 220 may also represent a standard USB A-connector. The first data interface 110, however, is again designed as already described with respect to FIG. 2 and comprises both, a power supply pin 111 and a communication pin 112.

The apparatus 203 is configured for transmitting a signal between the communication pin 112 of the first data interface 110 and the power supply pin 121 of the second data interface 220. For this, the communication line 106 is connected with the power supply line 105 at point 107. A signal transmitted over the communication line 105 is therefore multiplexed in the power supply line 105. For a decoupling of the power supply line 105 from the communication line 106 a capacitor 150 is provided between point 107 and the communication pin 112.

Apparatus 203 further comprises a coil 151 acting as a low pass filter element placed between the power supply pin 111 of the first data interface 110 and point 107 connecting the power supply line 105 with the communication line 106. For instance, high frequency components present in the power supply line may be filtered by coil 151.

Similar to the first apparatus 101 described with respect to FIG. 2, the first apparatus 201 comprises a data interface 130. In contrast to the apparatus 101, apparatus 201 comprises a modulator unit 152 comprising a modulator 153 and a demodulator 156. The modulator 153 is connected to a TX line 154, providing a signal to be sent over the communication pin 132. The signal is modulated on to a carrier frequency generated by a carrier frequency generator 155. The demodulator is connected to an RX line for receiving a signal to be received over the communication pun 132. For instance, the modulator and the demodulator are configured for a frequency shift keying (FSK) modulation and/or demodulation. The modulator unit 152 may additionally or alternatively be configured for different modulation schemes. The modulator unit 152 may comprise further components, for instance for filtering purposes. In this case, the modulator unit 152 further comprises a capacitor 158 and a resistor 159.

The data interface 110 and accordingly the data interface 130 may, as an example, represent a USB 2.0/3.0 Micro-A or Micro-B connector. In this case the communication pin may be represented by the identification (ID) pin of the USB connector.

For instance, the first apparatus 201 may send a signal modulated onto a carrier frequency over communication pin 132. The signal is then fed into the power supply line 105 by the third apparatus 203. The second apparatus 202 may receive the signal multiplexed with the power transmission at power supply pin 141. Here, the signal may again be extracted for further usage. Likewise, the second apparatus 202 may send a signal multiplexed with the power transmission over power supply pin 141. The third apparatus 203 transmits the signal to the communication pin 112 and the signal can be received by apparatus 201 at the communication bin 132. The signal is then demodulated or extracted by demodulator 156 and provided to the RX line 157.

Independently from the transmission of a signal over communication line 106 (for instance simultaneously or subsequently), a power transmission over the power supply line 145, 105, 135 may be performed, for instance from the second apparatus 202 to the first apparatus 201 via the third apparatus 203. The filter element 151 filters unwanted higher frequency components from the power supply line 105.

For instance, the apparatus 203 may be configured for performing embodiments of a method according to a second aspect of the invention. For instance, apparatus 203 may be configured for performing an exemplary embodiment of a method according to a second aspect of the invention, as illustrated by the flowchart 900 in FIG. 9.

According to step 901 of method 900, a signal is transmitted between a communication pin 112 of a first data interface 112 of the apparatus 203 and a power supply pin 121 of a second data interface 220 of the apparatus 203. As before, the first data interface 112 is configured for a connection with a first apparatus 201 and the second data interface 220 is configured for a connection with a second apparatus 202.

Figure 8:
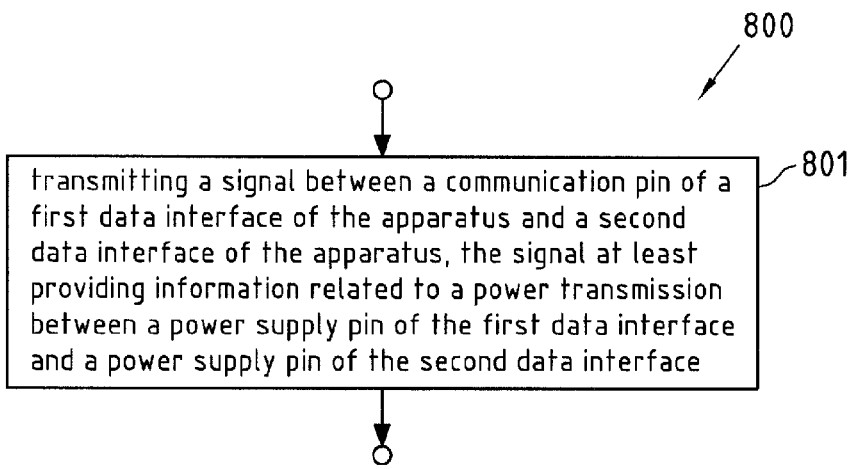
FIG. 8 an example embodiment of a method according to a first aspect of the invention.

In case the signal at least provides information related to a power transmission between a power supply pin 111 of the first data interface 110 and a power supply pin 121 of the second data interface 220, the apparatus 203 may also perform an exemplary embodiment of a method according to the first aspect of the invention, as illustrated in FIG. 8.

The apparatus 201 may be configured for performing embodiments of a method according to a third aspect of the invention. For instance, apparatus 201 may be configured for performing an exemplary embodiment of a method according to a third aspect of the invention, as illustrated by the flowchart 1000 in FIG. 10.

Apparatus 201 may reduce the resistance or energy dissipation in the power supply line 135 by reducing the electrical components in the power supply line 135, for instance, when charged with a dedicated power charger. Apparatus 201 may be compatible with a second apparatus requiring a modulated signal at the communication pin 132 for communication. In connection with apparatus 203, apparatus 201 may be compatible with devices requiring a signal modulated into the power supply line (such as apparatus 202).

For further and/or alternative features of the first, second and third apparatus 201, 202 and 203 and their working principle it is in particular referred to the description of FIG. 2.

Figure 4:
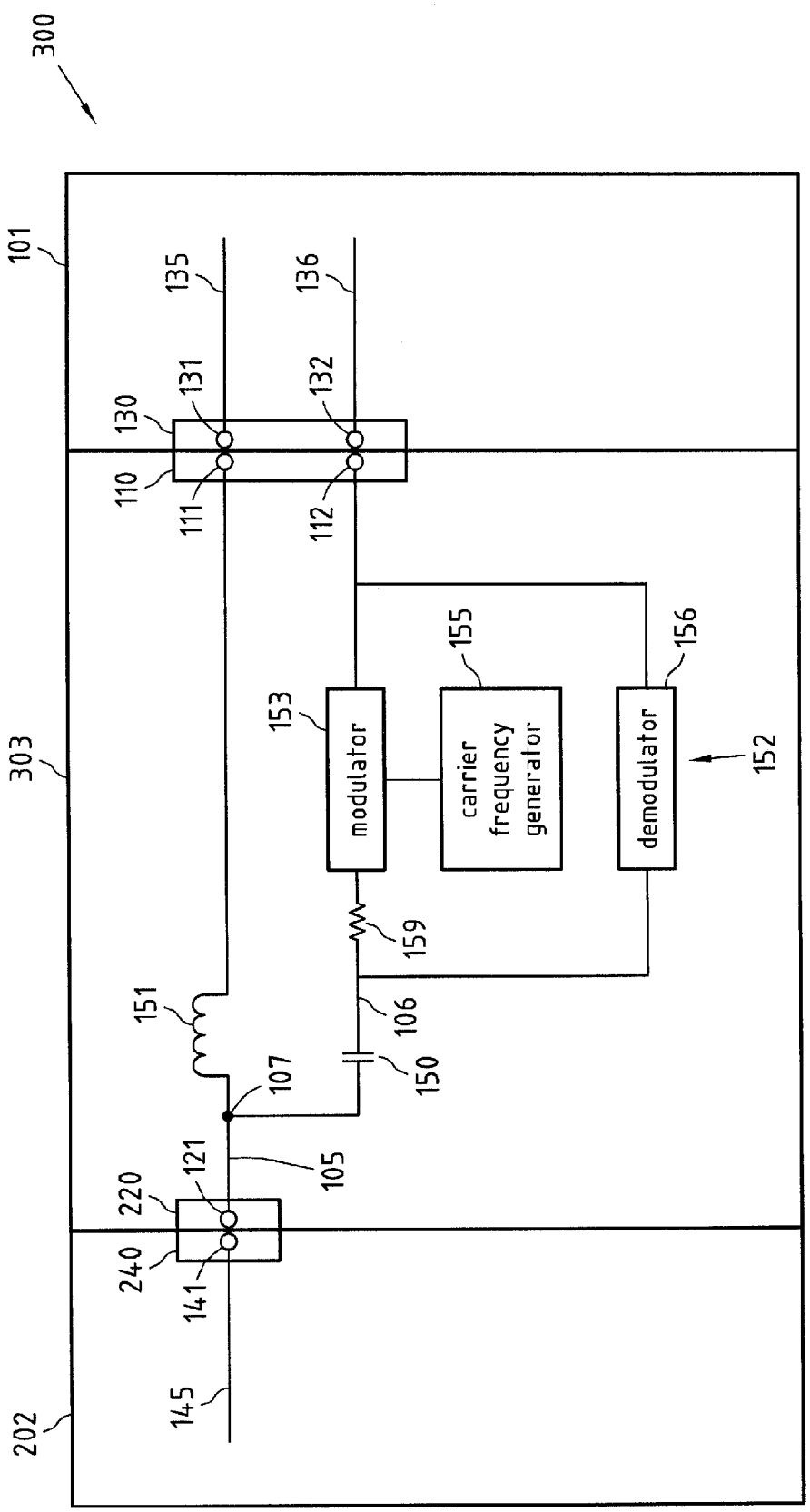
FIG. 4 another example embodiment of a system according to a fourth aspect of the invention, comprising another example embodiment of an apparatus according to a first and/or second aspect of the invention and an example embodiment of an apparatus according to a third aspect of the invention.

Turning now to FIG. 4, showing another example embodiment of a system 300 according to a fourth aspect of the invention, comprising another example embodiment of an apparatus 303 according to a first and/or second aspect of the invention and an example embodiment of an apparatus 101 according to a third aspect of the invention.

Regarding the apparatus 202 and its working principle, it is referred to FIG. 3 and the corresponding description, while, regarding the apparatus 101 and its working principle, it is referred to FIG. 2 and the corresponding description.

Regarding system 300 as shown in FIG. 4 and in contrast to the system 200 shown in FIG. 3, the modulator unit 152 is now implemented in the third apparatus 303 instead of the first apparatus 101.

For instance, the first apparatus 101 may send an unmodulated signal over communication pin 132, which is received by the third apparatus 303 at communication pin 112. The signal is then modulated onto a carrier frequency generated by carrier frequency generator 155 by apparatus 303, fed into the power supply line 105 at point 107 and transmitted to power supply pin 121. The second apparatus 202 may receive the signal multiplexed with the power transmission at power supply pin 141. Here, the signal may again be extracted for further usage. As before, the second apparatus 202 may send a signal multiplexed with the power transmission over power supply pin 141. The third apparatus 303 demodulates or extracts the signal by demodulator 156 and transmits the signal to the communication pin 112, such that the signal can be received by apparatus 101 at the communication bin 132. The signal is then provided to the communication line 136.

As before, a power transmission over the power supply line 145, 105, 135 may be performed, for instance from the second apparatus 202 to the first apparatus 101 via the third apparatus 303. Again, the filter element 151 filters unwanted high frequency components from the power supply line 105.

For instance, the apparatus 303 may be configured for performing embodiments of a method according to a second aspect of the invention. For instance, apparatus 303 may be configured for performing an exemplary embodiment of a method according to a second aspect of the invention, as illustrated by the flowchart 900 in FIG. 9.

In case the signal at least provides information related to a power transmission between a power supply pin 111 of the first data interface 110 and a power supply pin 121 of the second data interface 220, the apparatus 303 may also perform an exemplary embodiment of a method according to the first aspect of the invention, as illustrated in FIG. 8.

Apparatus 101 may reduce the resistance or energy dissipation in the power supply lines 135 by reducing the electrical components in the power supply line 135, for instance, when charged with a dedicated power charger. Apparatus 101 may be compatible with a second apparatus communicating without (de)modulating signals transmitted over the communication line (such as apparatus 102). In connection with apparatus 303, apparatus 101 may be compatible with a second apparatus requiring a signal modulated into the power supply line (such as apparatus 202).

For further and/or alternative features of the first second and apparatus 101, 202 and 303 and their working principle it is in particular referred to the description of FIGS. 2 and 3.

Figure 5:
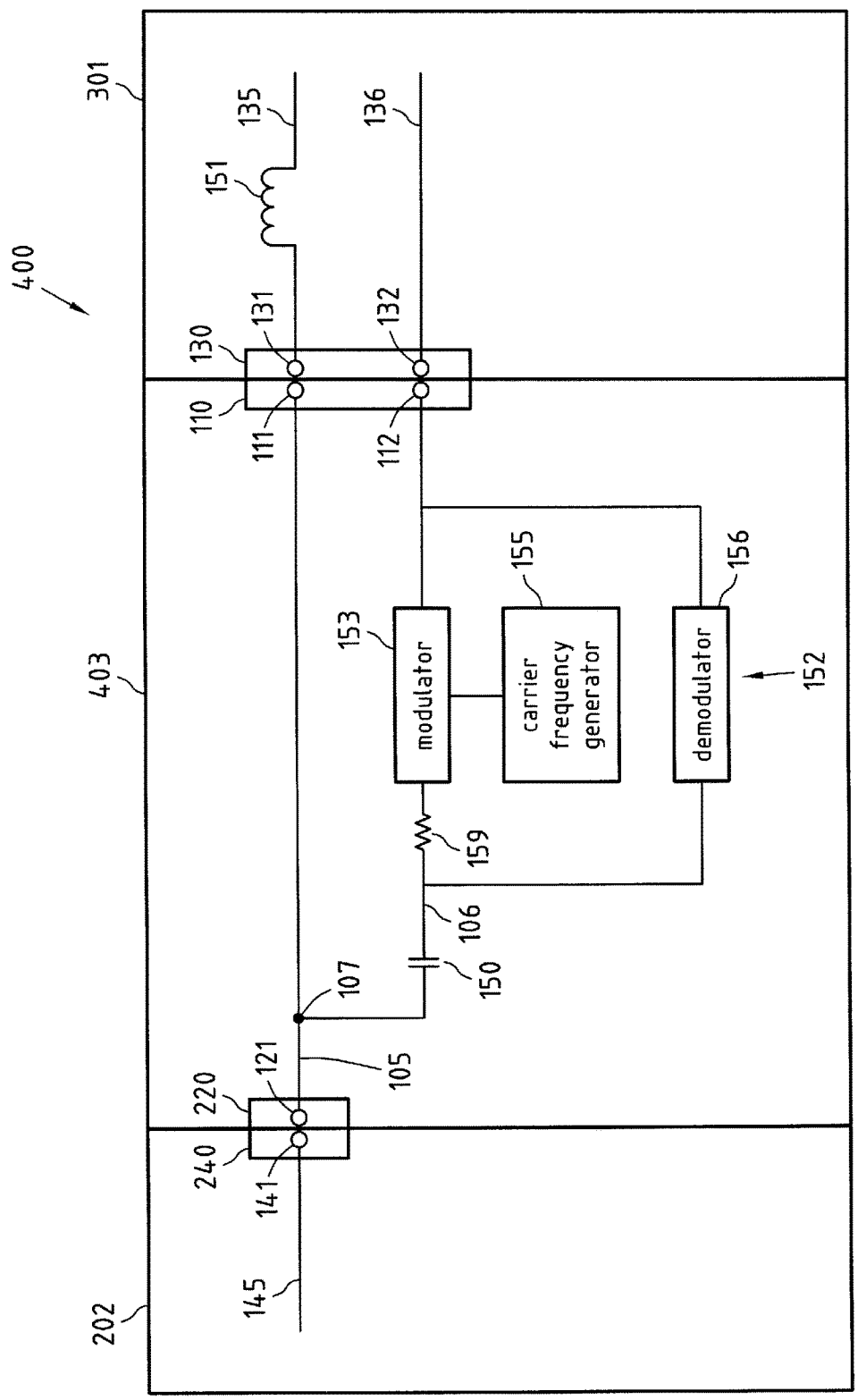
FIG. 5 another example embodiment of a system according to a fourth aspect of the invention, comprising another example embodiment of an apparatus according to a first and/or second aspect of the invention and another example embodiment of an apparatus according to a third aspect of the invention.

FIG. 5 shows another example embodiment of a system 400 according to a fourth aspect of the invention, comprising another example embodiment of an apparatus 403 according to a first and/or second aspect of the invention and an example embodiment of an apparatus 301 according to a third aspect of the invention.

Regarding the apparatus 202 and its working principle, it is referred to FIG. 3 and the corresponding description.

Regarding system 400 as shown in FIG. 5 and in contrast to the system 300 shown in FIG. 4, the filter element 151 is now implemented in the first apparatus 301 instead of the third apparatus 403.

As was the case with the apparatus 101, the date interface 130 of the first apparatus 101 and 301 may be used for transmitting unmodulated signals (as may be done in FIG. 2), while with a corresponding apparatus (such as apparatus 403) a communication comprising a (de)modulation may also be used with apparatus 101 and 301 (as may be done in FIG. 5).

In case of a power transmission, for instance from apparatus 202 as a power provider to apparatus 301 as a power consumer via apparatus 403, the power supply line 105 may comprise unwanted components, such as higher frequency components, the filter element 151 may filter such unwanted higher frequency components from the power supply line 135.

For instance, the apparatus 403 may be configured for performing embodiments of a method according to a second aspect of the invention. For instance, apparatus 303 may be configured for performing an exemplary embodiment of a method according to a second aspect of the invention, as illustrated by the flowchart 900 in FIG. 9.

In case the signal at least provides information related to a power transmission between a power supply pin 111 of the first data interface 110 and a power supply pin 121 of the second data interface 220, the apparatus 403 may also perform an exemplary embodiment of a method according to the first aspect of the invention, as illustrated in FIG. 8.

Apparatus 301 may be compatible with a second apparatus communicating without (de)modulating signals transmitted over the communication line (such as apparatus 102). In connection with apparatus 403, apparatus 301 may be compatible with a second apparatus requiring a signal modulated into the power supply line (such as apparatus 202).

For further and/or alternative features of the first second and third apparatus 301, 202 and 403 and their working principle it is in particular referred to the description of FIGS. 2, 3 and 4.

Figure 6:
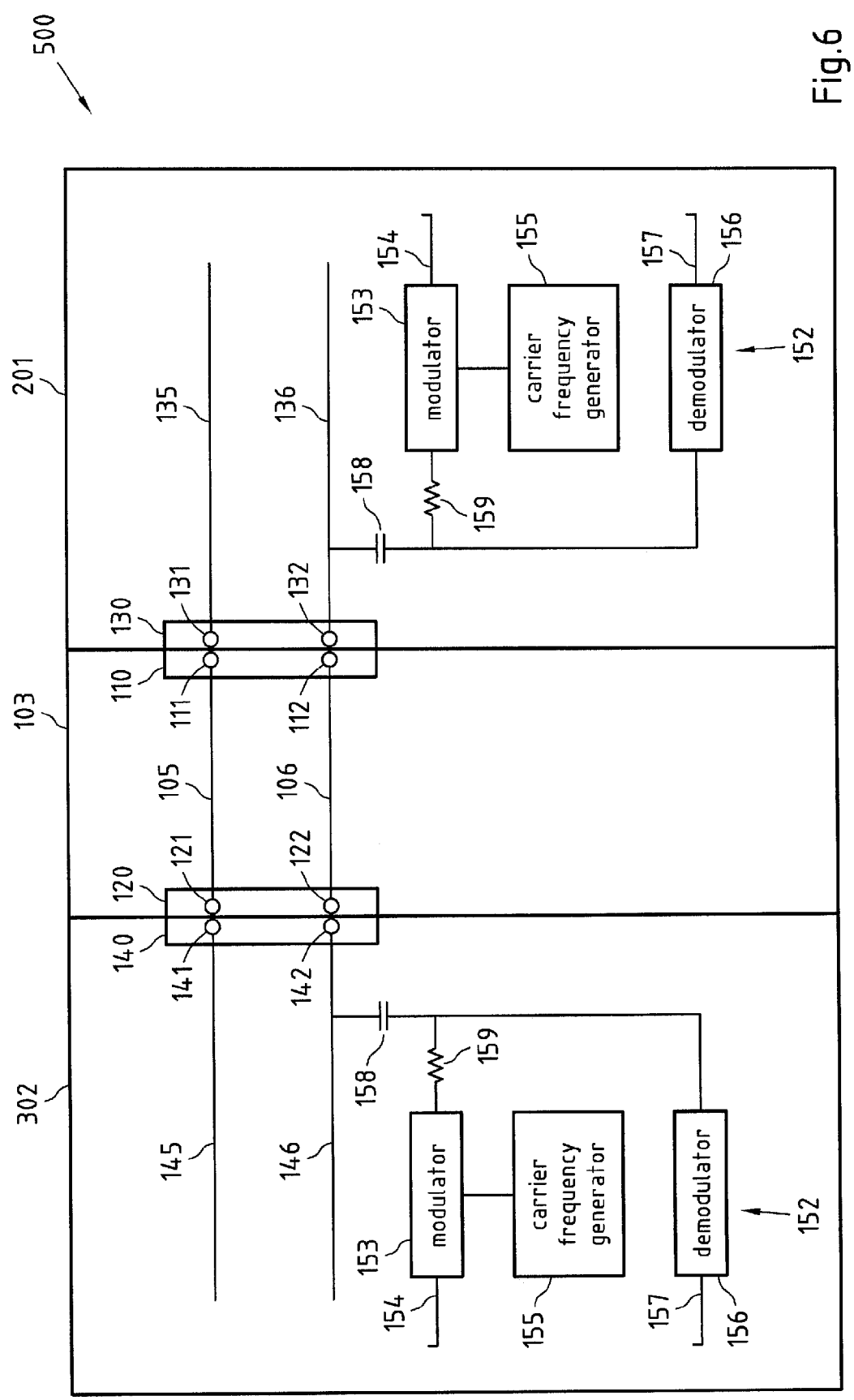
FIG. 6 another example embodiment of a system according to a fifth aspect of the invention, comprising an example embodiment of an apparatus according to a first aspect of the invention and example embodiments of apparatuses according to a third aspect of the invention.

FIG. 6 shows another example embodiment of a system 500 according to a fifth aspect of the invention, comprising an example embodiment of an apparatus 103 according to a first aspect of the invention and example embodiments of apparatuses 201, 302 according to a third aspect of the invention.

Regarding the apparatus 103 and its working principle, it is referred to FIG. 2 and the corresponding description, while, regarding the apparatuses 201, 302 and their working principles, it is referred to FIG. 3 and the corresponding description. Here, the first apparatus 201 is connected to the second apparatus 201 via apparatus 103. Regarding the illustrated components the first apparatus 201 is designed in correspondence with the second apparatus 302.

As in system 100, the third apparatus 103 comprises the first data interface 110 configured for a connection with the first apparatus 101, the first data interface 110 comprising at least a power supply 111 pin and a communication pin 112, and the second data interface 120 is configured for a connection with the second apparatus 102, the second data interface 120 comprising the power supply pin 121 and the communication pin 122. Again, the data interfaces 110, 120 may correspond to the data interfaces 11, 12 or 21, 22 depicted in FIGS. 1a, 1b, for instance.

As before, the apparatus 103 may be configured for performing embodiments of a method according to a first aspect of the invention. For instance, apparatus 103 may be configured for performing an exemplary embodiment of a method according to a first aspect of the invention, as illustrated by the flowchart 800 in FIG. 8.

The first and second apparatuses 201, 302 may be configured for performing embodiments of a method according to a third aspect of the invention. For instance, the apparatuses 201, 302 may be configured for performing an exemplary embodiment of a method according to a third aspect of the invention, as illustrated by the flowchart 1000 in FIG. 10.

The signal transmitted between the first apparatus 201 and the second apparatus 302 via communication line 106 may in particular be an unmodulated signal.

Communication line 106 may also be used for transmitting a signal other than signals providing information related to a power transmission.

As already described with respect to FIG. 3, the first apparatus 201 comprises a modulator unit 152 comprising a modulator 153 and a demodulator 156. Again, the modulator 153 and the demodulator 156 may, for instance, be configured for a frequency shift keying (FSK) modulation and/or demodulation. However, the modulator unit 152 may additionally or alternatively be configured for different modulation schemes.

The data interfaces 130, 140 of the first apparatus 201 and the second apparatus 302 (and correspondingly the data interfaces 110 and 120) may be identical. However, it may be also possible to provide different data interfaces for the first and second apparatus (and correspondingly for the data interfaces 110 and 120).

Apparatus 201 may reduce the resistance or energy dissipation in the power supply lines 135 by reducing the electrical components in the power supply line 135, for instance, when charged with a dedicated power charger.

Apparatus 201 may be compatible with a second apparatus requiring a modulated signal at the communication pin 132 (such as apparatus 302).

For further and/or alternative features of the apparatuses 103 and 201 and their working principle it is in particular referred to the description of FIGS. 2, 3, 4 and 5.

Figure 7:
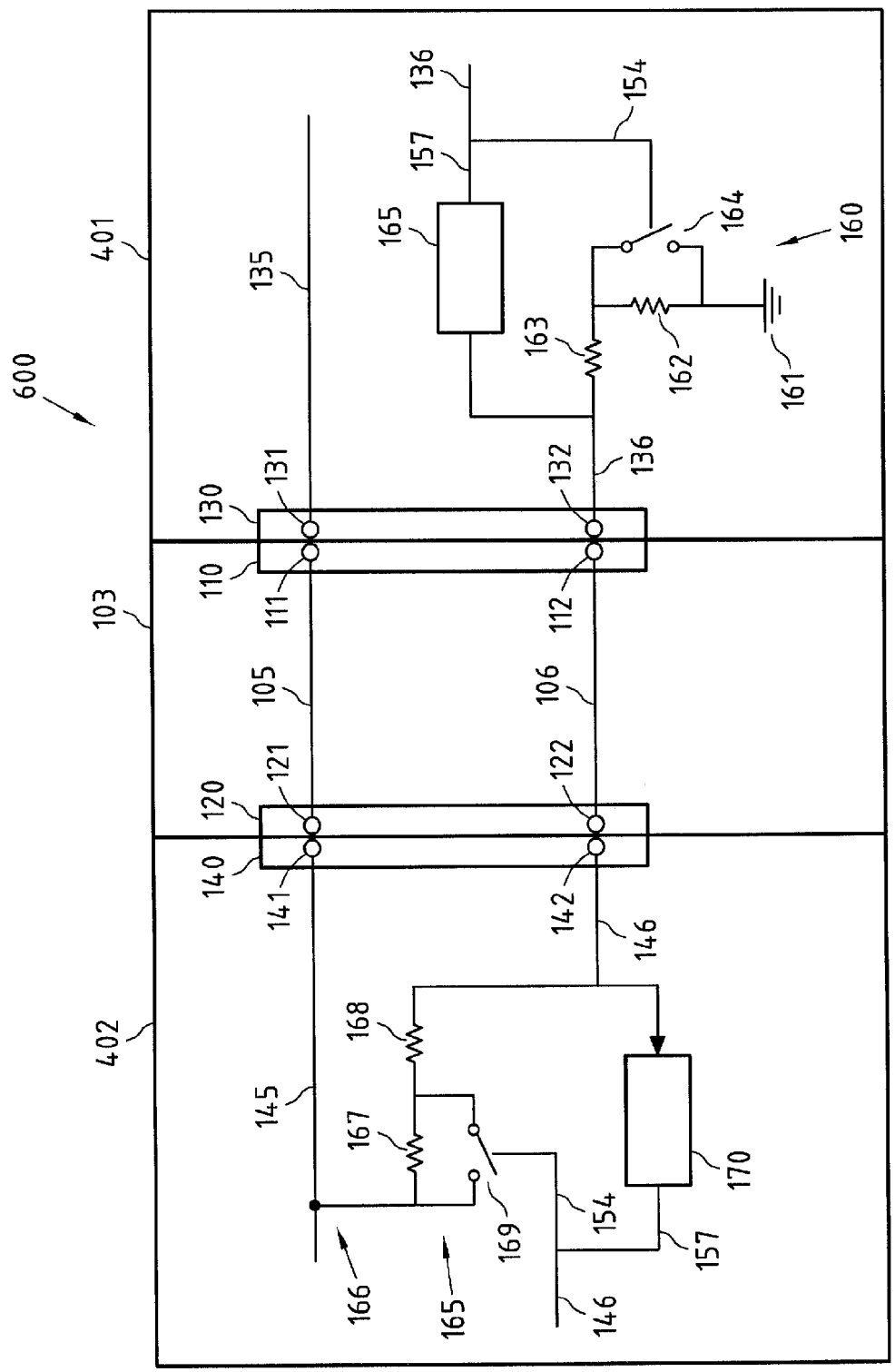
FIG. 7 another example embodiment of a system according to a fifth aspect of the invention, comprising an example embodiment of an apparatus according to a first aspect of the invention and further example embodiments of apparatuses according to a third aspect of the invention.

FIG. 7 shows another example embodiment of a system 600 according to a fifth aspect of the invention, comprising an example embodiment of an apparatus 103 according to a first aspect of the invention and further example embodiments of apparatuses 401, 402 according to a third aspect of the invention.

Regarding the apparatus 103 and its working principle, it is referred to FIGS. 2 and 6 and the corresponding description. Again, the power supply lines 145, 105, 135 may be used for a power transmission, for instance from apparatus 402 as a power provider to apparatus 401 as a power consumer via apparatus 103.

The system 600 shows an alternative modulation scheme of a signal communicated over the communication pins 132, 142 via the third apparatus 103. The apparatus 401 comprises a voltage pull-down element 160 placed between the communication pin 132 and a ground level 161. The apparatus 401 is configured for modulating a quality of the voltage pull-down element 160 in order to communicate a signal over the communication pin 132. For instance, this may be done by a controller, such as controller 137 depicted in FIG. 2. Here, the voltage pull-down element comprises resistors 162, 163 and switching element 164. The switching element 164 in connection with a signal to be sent at the TX line 154 of apparatus 401 can thus modulate a quality of the voltage pull-down element 160 in order to communicate the signal over the communication pin 132. A receiving unit 165 may receive and provide a signal received at the communication pin 132 to RX line 157 of apparatus 401.

The apparatus 402 comprises a voltage pull-up element 165 placed between the communication pin 142 and a predefined voltage level, which is the voltage level 166 of the power supply pin 141 in this case. The apparatus 402 is configured for modulating a quality of the voltage pull-up element 165 in order to communicate a signal over the communication pin 142. For instance, this may be done by a controller, such as controller 147 depicted in FIG. 2. Here, the voltage pull-up element comprises resistors 167, 168 and switching element 169. The switching element 169 in connection with a signal to be sent at the TX line 154 of apparatus 402 can thus modulate a quality of the voltage pull-up element 165 in order to communicate the signal over the communication pin 142. A receiving unit 170 may receive and provide a signal received at the communication pin 142 to RX line 157 of apparatus 402.

In connection with communication pins 132, 142, the voltage pull-down element 160 and/or the voltage pull-up element 165 may also be used for an indication of a device connection, for instance that a connection between apparatus 401 and 402 is established. Also, the voltage pull-down element 160 and/or the voltage pull-up element 165 may be used for device role (host/device/dual) identification purposes. A connection may, for instance, be detected by receiving units 165 and/or 170.

As before, the apparatus 103 may be configured for performing embodiments of a method according to a first aspect of the invention. For instance, apparatus 103 may be configured for performing an exemplary embodiment of a method according to a first aspect of the invention, as illustrated by the flowchart 800 in FIG. 8.

The first apparatus 401 and second apparatuses 402 may be configured for performing embodiments of a method according to a third aspect of the invention. For instance, the apparatuses 401, 402 may be configured for performing an exemplary embodiment of a method according to a third aspect of the invention, as illustrated by the flowchart 1000 in FIG. 10.

Basically, communication line 106 may also be used for transmitting a signal other than signals providing information related to a power transmission.

System 600 may provide reduced resistance or energy dissipation in the power supply lines 105, 135, 145 by reducing the electrical components in the power supply lines. System 600 may avoid the need of additional (de)modulators, for instance FSK-(de)modulators.

For further and/or alternative features of the first second and third apparatus 103 and 201 and their working principle it is in particular referred to the description of FIGS. 2, 3, 4, 5 and 6.

FIGS. 11 to 14 show exemplary pinning concepts of data interfaces. For instance, the pining concepts may represent pinning concepts used for the data interface of embodiments of the first apparatus (such as apparatus 101, 201, 301, 401), of the second apparatus (such as apparatus 102, 202, 302, 402) and/or for the first and/or second data interface of embodiments of the third apparatus (such as apparatus 103, 203, 303, 403).

The depicted pinning concepts in FIGS. 11 to 14 are supposed to only illustrate provided pins and to not define any geometrical position or location of the pins in a data interface. For instance, the pins may be ordered differently or positioned in other geometrical forms. However, the pins may be arranged as illustrated. Further, only some of the pins illustrated or additional pins may be provided.

In FIGS. 11 to 14, the CC1 and/or CC2 pin may represent a communication pin of a data interface according to any aspect of the invention. One or more of the VBUS pins may represent a power supply pin of a data interface according to any aspect of the invention. One or more of the GND pins may represent a ground pin of a data interface according to any aspect of the invention. One or more of the D+, D−, TX1+, TX1−, RX1+, RX1−, TX2+, TX2−, RX2+, RX2− may represent a data pin of a data interface according to any aspect of the invention.

The D+, D− pins may represent corresponding data transmission pins of a USB 2.0 and/or USB 3.0 compatible data interface. The TX1+, RX1+, TX1−, RX1− pins and/or the TX2+, RX2+, TX2−, RX2− pins may represent corresponding data transmission pins of a USB 3.0 compatible data interface, for instance for providing USB 3.0 SuperSpeed compatibility. The VBUS and/or ground pins may also represent corresponding pins of a USB 2.0 and/or 3.0 compatible data interface.

FIG. 11 shows a pinning concept for a data interface comprising the following set of pins CC1, TX2+, GND, TX1+, VBUS, D+, D−, GND, RX1−, GND, RX2−, VBUS in the upper row and optionally with an inverted order of a corresponding set of pins VBUS, RX2+, GND, RX1+, GND, D−, D+, VBUS, TX1−, GND, TX2−, CC2 in the lower row. The provision of two sets of pins at a data interface may facilitate the provision of connectors which can also be used upside down.

FIG. 12a shows an alternative pinning concept. In contrast to the concept illustrated in FIG. 11, the TX2/RX2 pins are not connected (NC). The pinning concept illustrated in FIG. 12a may for instance be used in a connector, for instance a receptacle, supporting USB 3.0.

FIG. 12b shows a further alternative pinning concept, which in contrast to the concept illustrated in FIG. 11 only comprises an upper row of pins and wherein the TX1/RX1 and TX2/RX2 pins are not connected (NC). The pinning concept illustrated in FIG. 12b may for instance be used in a connector, for instance a receptacle, only supporting USB 2.0.

Figure 13:
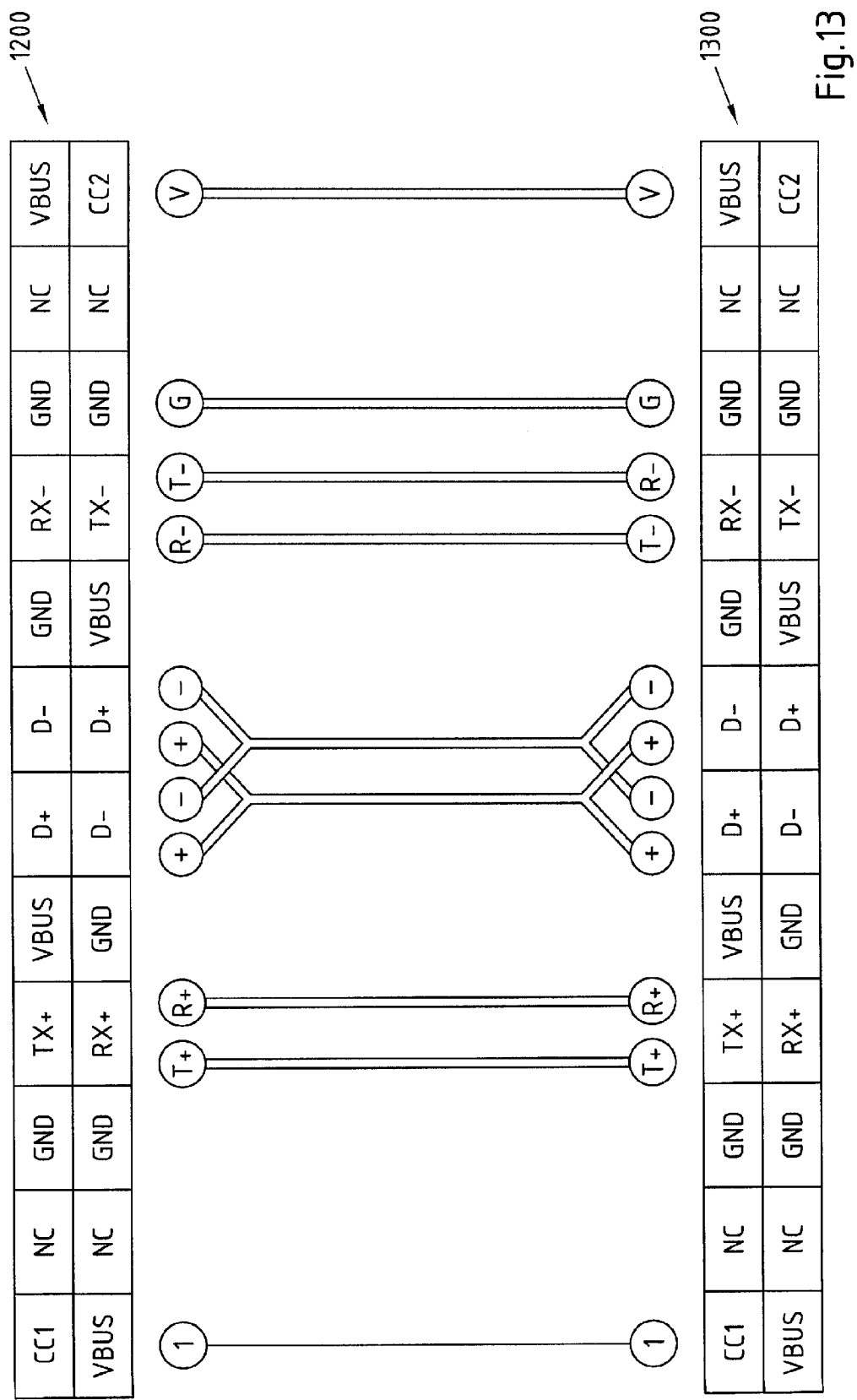

FIG. 13 illustrates a pinning concept, which may in particular be used in embodiments of a third apparatus, which may perform a method according to a first aspect of the invention. The concept may for instance be used in a cable or an adapter.

The illustrated upper pinning concept 1200 may for instance be a pinning concept or a part thereof of a first data interface of a third apparatus and the illustrated lower pinning concept 1300 may be a pinning concept or a part thereof of a second data interface of a third apparatus. The two pinning concepts 1200 and 1300 both use the pining concept already illustrated in FIG. 12a. FIG. 13 further illustrated schematically the wiring of the pins. Thus, FIG. 13 may schematically represent an exemplary embodiment of a third apparatus.

In the illustrated case, nine wires are used to connect pins of the upper pinning concept 1200 with corresponding counterparts of the lower pinning concept 1300. However, there may also be used further or fewer wires connecting further or fewer pins with each other. For instance, there may also be additional wiring for shields and/or drains.

The wire denoted 1 connects the corresponding CC1 pins with each other and may, for instance, represent a communication line of an exemplary embodiment of a third apparatus according to the invention. The wires denoted TX+, TX−, RX+, RX− are connected by four wires with its corresponding counterparts. The two D+ pins as well as the two D− pins may be connected to their counterparts by a single wire each, as it is not differentiated between multiple D+ or D− pins, for instance in the USB 2.0 standard. One or more of the GND pins may be connected by the wire denoted G. The wire denoted V connects one or more of the VBUS pins. The wire V may, for instance, represent a power supply line of an exemplary embodiment of a third apparatus.

Figure 14:
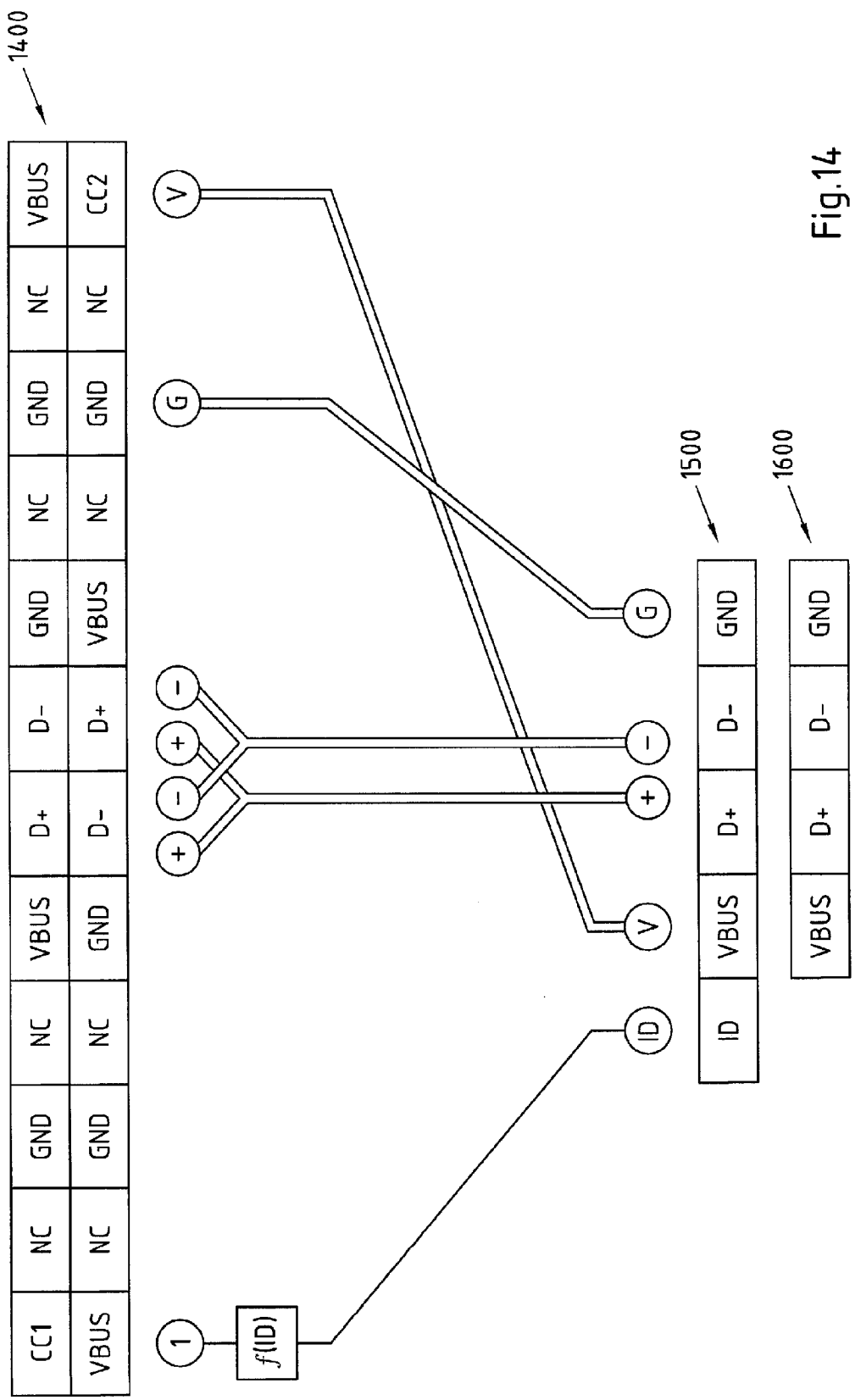

FIG. 14 also illustrates a pining concept, which may in particular be used in embodiments of a third apparatus, which may perform a method according to a first aspect of the invention. The concept may for instance be used in a cable or an adapter.

The illustrated upper pinning concept 1400 may for instance be a pinning concept or a part thereof of a first data interface of a third apparatus and one of the illustrated lower pinning concepts 1500 or 1600 may be a pinning concept or a part thereof of a second data interface of a third apparatus. The pinning concept 1400 is similar to the one of FIG. 12a with the difference that the TX and RX pins are not connected (NC). The pinning concept 1400 is also similar to that of FIG. 12b) with the difference that also a lower row of pins is provided comprising the pins of the upper row in reversed order. The pinning concept 1500 only comprises the pins ID, VBUS, D+, D−, GND and may represent a USB 2.0 Micro-A or Micro-B connector, for instance. The pinning concept 1600 only comprises the pins VBUS, D+, D−, GND and may represent a USB 2.0 Type A or Type B connector, for instance. Thus, FIG. 14 may schematically represent an exemplary embodiment of a third apparatus.

In case pinning concept 1500 is used for the second data interface, five wires are used to connect pins of the upper pinning concept 1400 with corresponding counterparts of the lower pinning concept 1500. In case of pinning concept 1600, four wires are used to connect pins of the upper pinning concept 1400 with corresponding counterparts of the lower pinning concept 1600. However, there may also be used further or fewer wires connecting further or fewer pins with each other. For instance, there may also be additional wiring for shields and/or drains.

In case of the pinning concept 1500, an ID pin is provided. The ID pin may be used for device role (host/device/dual) identification purposes. The ID pin may also represent a communication pin according to embodiments of aspects the invention.

In case of the lower pinning concept 1500, the wire denoted 1/ID connects the CC1 pin with he ID pin and may, for instance, represent a communication line of an exemplary embodiment of a third apparatus according to the invention. In case the lower pinning concept 1600 is used, no ID pin is provided and the CC1 pin of the upper pinning concept 1400 is not connected.

As before, the two D+ pins as well as the two D− pins may be connected to their counterparts by a single wire each. One or more of the GND pins may be connected by the wire denoted G. The wire denoted V connects one or more of the VBUS pins. The wire V may, for instance, represent a power supply line of an exemplary embodiment of a third apparatus.

The wiring may also be such that the signal of the CC1 pin may be multiplexed with the V line, as for instance in embodiments according to the second aspect of the invention.

FIG. 15 shows further example embodiments of apparatuses, which may be according to different aspects of the invention.

Figure 15A:
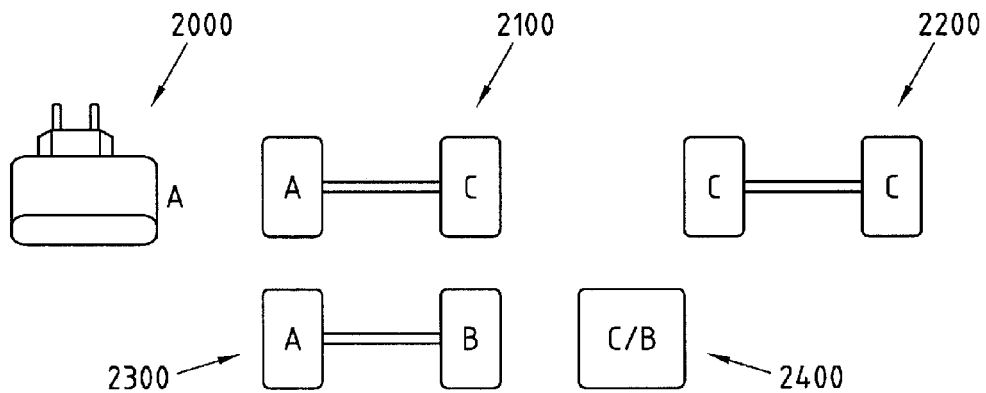
FIGS. 15, 16 further example embodiments of apparatuses, which may be according to different aspects of the invention.

FIG. 15a shows a charger 2000 which may represent an embodiment of a second apparatus. The charger 2000 may comprise a USB A-type interface (for instance a receptacle) as indicated by the letter A. The cable 2100 may represent an embodiment of a third apparatus for the connection of the charger 2000 with a first apparatus (not depicted). The cable 2100 may in particular be an embodiment of an apparatus according to a second aspect of the invention with the first data interface denoted by letter C. The second data interface of cable 2100 may represent a USB Type A interface denoted by letter A for the connection with charger 2000. The cable 2200 may in particular be an embodiment of a third apparatus for performing an embodiment of a method according to a first aspect of the invention. The first and second data interface for a connection with a first and second apparatus is denoted by letter C.

For the connection of the charger 2000 to an apparatus comprising a USB Micro-B interface, cable 2300 and/or adapter 2400 may be provided. The cable 2300 has a USB Type A interface for the connection to charger 2000 and a USB Micro-B interface for the connection to an apparatus comprising a USB Micro-B interface. The adapter 2400 may represent an embodiment of a third apparatus. The adapter 2400 may in particular be an embodiment of an apparatus according to a second aspect of the invention with the first data interface denoted by letter C for the connection with cable 2100. The second data interface of adapter 2400 may represent a USB Micro-B interface denoted by letter B for the connection to an apparatus comprising a USB Micro-B interface.

Figure 15B:
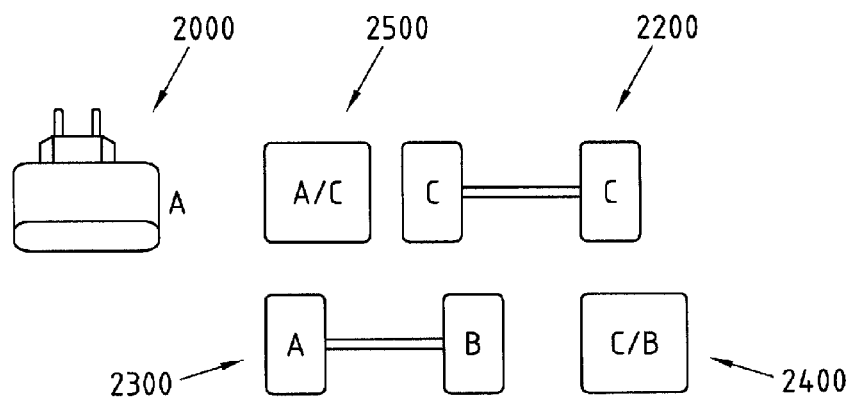

FIG. 15b shows a system similar to the one illustrated in FIG. 15a. The system shown in FIG. 15b differs from that in FIG. 15a in that the cable 2100 is designed as an adapter 2500. The adapter 2500 allows the connection of cable 2200 to charger 2000.

Figure 15C:
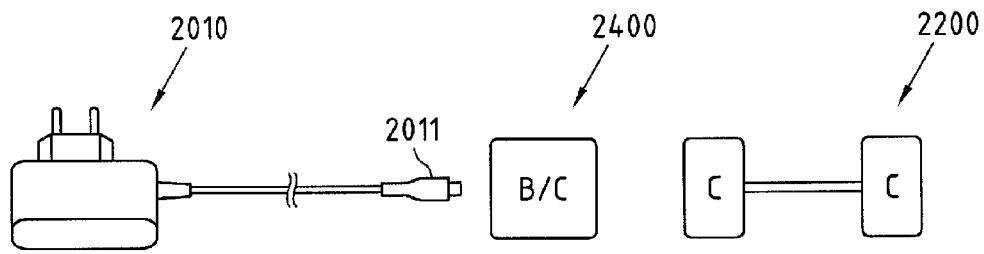

FIG. 15c shows a charger 2010 which differs from charger 2000 in that it comprises a captive cable with a USB Micro-B connector 2011. Adapter 2400 allows the connection of cable 2200 to charger 2010.

Figure 16A:
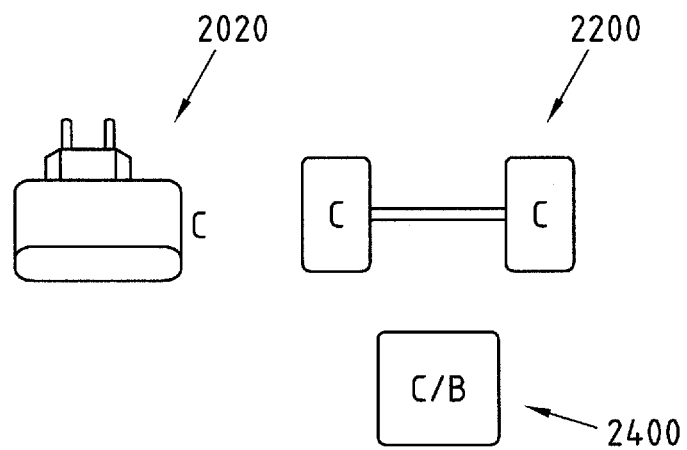
Figure 16B:
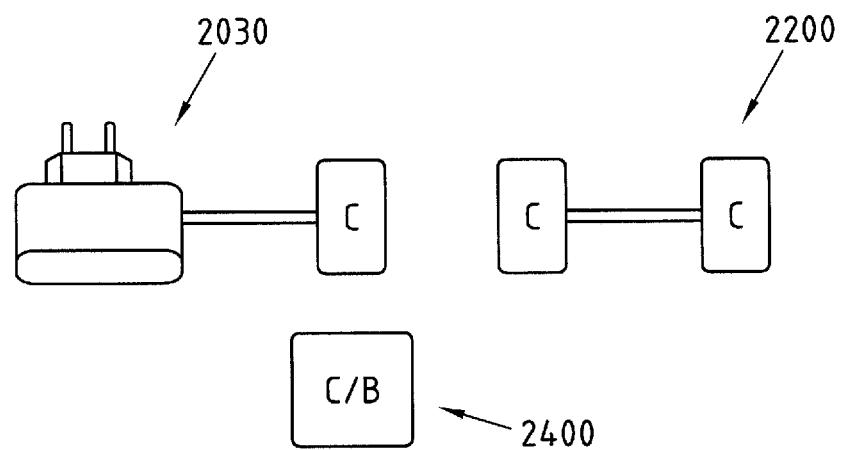

FIG. 16a shows a charger 2020 which differs from charger 2000 in that it comprises an interface which can be directly connected to cable 2200 as denoted with letter C. Thus, the interface of charger 2020 is compatible with the first and/or second data interface of cable 2200. Again, adapter 2400 may allow a connection of the charger 2020 over cable 2200 and adapter 2400 with an apparatus comprising a USB Micro-B interface.

The adapter 2030 shown in FIG. 16c differs from adapter 2020 in that the adapter comprises a captive cable which comprises an interface for the connection to cable 2200 as denoted with letter C.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone.

With respect to the aspects of the invention and their embodiments described in this application, it is understood that a disclosure of any action or step shall be understood as a disclosure of a corresponding (functional) configuration of a corresponding apparatus (for instance a configuration of the computer program code and/or the processor and/or some other means of the corresponding apparatus), of a corresponding computer program code defined to cause such an action or step when executed and/or of a corresponding (functional) configuration of a system (or parts thereof).

The aspects of the invention and their embodiments presented in this application and also their single features shall also be understood to be disclosed in all possible combinations with each other. It should also be understood that the sequence of method steps in the flowcharts presented above is not mandatory, also alternative sequences may be possible.

The invention has been described above by non-limiting examples. In particular, it should be noted that there are alternative ways and variations which are obvious to a skilled person in the art and can be implemented without deviating from the scope and spirit of the appended claims.

The invention claimed is:

1. A method performed by an apparatus, comprising:
transmitting a signal between a communication pin of a first data interface of the apparatus and a power supply pin of a second data interface of the apparatus, wherein the signal at least provides information related to a power transmission between a first apparatus and a second apparatus via a power supply pin of the first data interface and the power supply pin of the second data interface, wherein the first data interface is configured for a connection with the first apparatus and the second data interface is configured for a connection with the second apparatus.

2. The method according to claim 1, wherein the information related to the power transmission comprises information about at least one of a power, a voltage and a current supported by at least one of the first apparatus and the second apparatus.

3. The method according to claim 1, wherein the transmitting of the signal is part of a power delivery negotiating process.

4. The method according to claim 1, further comprising:
transmitting data between a data pin of the first data interface and a data pin of the second data interface.

5. The method according to claim 1, wherein at least one of the first data interface and the second data interface represents a Universal Serial Bus (USB) interface.

6. The method according claim 1, wherein the apparatus is a cable or an adapter comprising a first connector comprising the first data interface and a second connector comprising the second data interface.

7. The method according to claim 1, further comprising:
transmitting power between the power supply pin of the first data interface and the power supply pin of the second data interface.

8. The method according to claim 7, further comprising:
filtering power transmitted between the power supply pin of the first data interface and the power supply pin of the second data interface.

9. The method according to claim 8, wherein the filtering uses a filter element comprising a low pass filter.

10. The method according to claim 1, wherein the transmitting of the signal between the communication pin of the first data interface and the power supply pin of the second data interface comprises at least one of modulating and demodulating at least the signal.

11. The method according to claim 10, wherein the signal transmitted from the first communication pin to the power supply pin of the second data interface, is used in a modulation process and the signal transmitted from the power supply pin of the second data interface to the first communication pin is used in a demodulation process.

12. The method according to claim 10, wherein at least one of the modulating and demodulating comprises frequency shift keying.

13. An apparatus, comprising:
a first data interface configured for a connection with a first apparatus, the first data interface comprising at least a power supply pin and a communication pin; and
a second data interface configured for a connection with a second apparatus, the second data interface comprising at least a power supply pin;
wherein the apparatus is configured for transmitting power between the first apparatus and the second apparatus via the power supply pin of the first data interface and the power supply pin of the second data interface; and wherein the apparatus is configured for transmitting a signal between the communication pin of the first data interface and the power supply pin of the second data interface.

14. The apparatus according to claim 13, wherein the apparatus further comprises at least one of a modulator and a demodulator for using a modulation and demodulation, respectively, in the transmission of the signal between the communication pin of the first data interface and the power supply pin of the second data interface.

15. The apparatus according to claim 14, wherein the modulator is configured for using the signal transmitted from the communication pin of the first data interface to the power supply pin of the second data interface in a modulation process and the demodulator is configured for using the signal transmitted from the power supply pin of the second data interface to the communication pin of the first data interface in a demodulation process.

16. The apparatus according to claim 14, wherein at least one of the modulator and demodulator is configured for a modulation and demodulation of at least the signal, respectively, by frequency shift keying.

17. The apparatus according to claim 13, further comprising a filter element placed between the power supply pin of the first data interface and the power supply pin of the second data interface.

18. The apparatus according to claim 17, wherein the filter element comprises a low pass filter.

19. The apparatus according to claim 13, wherein the first data interface and the second data interface each further comprise at least a data pin for transmitting a data signal between the data pin of the first data interface and the data pin of the second data interface.

20. The apparatus according to claim 13, wherein the apparatus is a cable or an adapter comprising a first connector comprising the first data interface and a second connector comprising the second data interface.

21. A method performed by an apparatus, comprising:
communicating a signal over a communication pin of a data interface of the apparatus, the signal at least providing information related to a power transmission over a power supply pin of the data interface of the apparatus;
wherein the data interface is configured for a connection with a second apparatus, and wherein the communication pin of the data interface is coupled to a pull-down element or a pull-up element and configured to detect the connection to the second apparatus; and
wherein the communicating of the signal comprises modulating a voltage level at the communication pin, wherein the signal sent over the communication pin is used in a modulation process and the signal received over the communication pin is used in a demodulation process.

22. The method according to claim 21, wherein at least one of the modulation process and demodulation process comprises frequency shift keying.

23. The method according to claim 21, further comprising:
determining a type of a second apparatus being connected to the data interface of the apparatus based on the state of the communication pin of the data interface.

24. An apparatus, comprising:
a data interface configured for a connection of the apparatus with a second apparatus, the data interface comprising at least a power supply pin for transmitting power and a communication pin, wherein the communication pin is coupled to a pull-down element or a pull-up element and configured to detect the connection to the second apparatus;
a controller configured for communicating a signal over the communication pin at least for providing information related to a power transmission over the power supply pin, wherein communicating the signal comprises modulating a voltage level at the communication pin; and
at least one of a modulator and demodulator for using a modulation and demodulation, respectively, in the communication of the signal communicated over the communication pin.

25. The apparatus according to claim 24, wherein at least one of the modulator and demodulator is configured for modulation and demodulation of at least the signal, respectively, by frequency shift keying.

26. The apparatus according to claim 25, wherein the controller is configured for determining a type of the second apparatus being connected to the data interface of the apparatus based on the state of the communication pin of the data interface.

27. The apparatus according to claim 25, wherein the apparatus further comprises a filter element for filtering power transmitted over the power supply pin.

* * * * *